(12) United States Patent
Yang

(10) Patent No.: US 11,319,456 B2
(45) Date of Patent: May 3, 2022

(54) FIBER COATING COMPOSITIONS WITH ACYLGERMANE PHOTOINITIATORS

(71) Applicant: CORNING INCORPORATED, Corning, NY (US)

(72) Inventor: Bin Yang, Painted Post, NY (US)

(73) Assignee: Corning Incorporated, Corning, NY (US)

(*) Notice: Subject to any disclaimer, the term of this patent is extended or adjusted under 35 U.S.C. 154(b) by 196 days.

(21) Appl. No.: 16/681,297

(22) Filed: Nov. 12, 2019

(65) Prior Publication Data

US 2020/0181443 A1 Jun. 11, 2020

Related U.S. Application Data

(60) Provisional application No. 62/775,474, filed on Dec. 5, 2018.

(51) Int. Cl.
*C09D 135/02* (2006.01)
*C03C 25/106* (2018.01)
(Continued)

(52) U.S. Cl.
CPC .......... *C09D 135/02* (2013.01); *C03C 25/106* (2013.01); *C03C 25/285* (2013.01);
(Continued)

(58) Field of Classification Search
CPC ... C09D 135/02; C03C 25/106; C03C 25/285; C08F 222/1006; C08F 222/1065; G02B 6/02395
See application file for complete search history.

(56) References Cited

U.S. PATENT DOCUMENTS 6,797,740 B2 * 9/2004 Abel .................. C09D 4/06
522/81
9,708,442 B1 * 7/2017 Kwisnek ............. G03F 7/029
(Continued)

FOREIGN PATENT DOCUMENTS

EP          3246001 A1   11/2017
WO      2018089290 A1    5/2018

OTHER PUBLICATIONS

Ganster et al., New Photocleavable Structures. Diacylgermane-Based Photoinitiators for Visible Light Curing, Macromolecules 2008, 41, 2394-2400 (Year: 2008).*
(Continued)

*Primary Examiner* — Peter Radkowski
(74) *Attorney, Agent, or Firm* — Kevin L. Bray

(57) ABSTRACT

The present disclosure provides coating compositions that can be cured at fast rates as well as coatings and cured products formed from the coating compositions. The coating compositions include an acylgermane photoinitiator that leads to fast cure speeds. The coating compositions include primary coating compositions and secondary coating compositions. The coating compositions can be cured to form primary and secondary coatings of optical fibers. The primary coatings feature low Young's modulus and high tear strength. The primary coatings provide good microbending performance and are resistant to defect formation during the fiber draw process and subsequent handling operations. The secondary coatings feature high Young's modulus and good puncture resistance.

4 Claims, 3 Drawing Sheets

(51) Int. Cl.
    *C03C 25/285*     (2018.01)
    *C08F 222/10*     (2006.01)
    *G02B 6/02*     (2006.01)

(52) U.S. Cl.
    CPC .... *C08F 222/1006* (2013.01); *G02B 6/02395* (2013.01); *C08F 222/1065* (2020.02)

(56) References Cited

U.S. PATENT DOCUMENTS

| | | | | |
|---|---|---|---|---|
| 2002/0102086 A1* | 8/2002 | Fewkes | ............... | C03C 25/106 385/128 |
| 2002/0161154 A1* | 10/2002 | Cattron | ............... | C09D 4/06 526/301 |
| 2003/0169989 A1* | 9/2003 | Abel | ............... | C03C 25/1065 385/128 |
| 2008/0277814 A1* | 11/2008 | Moszner | ............... | A61K 6/887 264/19 |
| 2012/0010066 A1* | 1/2012 | Fischer | ............... | A61K 6/887 501/32 |
| 2016/0349453 A1* | 12/2016 | Wu | ............... | G02B 6/245 |
| 2018/0265527 A1* | 9/2018 | Moszner | ............... | C08F 2/50 |

OTHER PUBLICATIONS

Rajan et al., Evaluation of the physical properties of dental resin composites using optical fiber sensing technology, dental materials 3 2 (2 0 1 6) 1113-1123 (Year: 2016).*

Haas et al; "Recent Advances in Germanium-Based Photoinitiator Chemistry"; Chem. Eur. J. 24; pp. 8258-8267 (2018.

Santini et al; "Photoinitiators in Dentistry: A Review"; Primary Dental Journal; vol. 2, No. 4 (2013) pp. 30-33.

Singh et al; "Current Photo-Initiators in Dental Materials"; International Journal of Applied Dental Sciences; 3 (1); pp. 17-20 (2017.

International Search Report and Written Opinion of the International Searching Authority; PCT/US2019/062931; dated Jul. 10, 2020; 15 Pages; European Patent Office.

Invitation to Pay Additional Fees and Partial Search Report of the European International Searching Authority; PCT/US2019/062931; dated Mar. 6, 2020; 11 Pgs.

* cited by examiner

FIBER COATING COMPOSITIONS WITH ACYLGERMANE PHOTOINITIATORS

This application claims the benefit of priority to U.S. Provisional Application Ser. No. 62/775,474 filed on Dec. 5, 2018, the content of which is relied upon and incorporated herein by reference in its entirety.

FIELD OF THE DISCLOSURE

This disclosure pertains to curable coating compositions with fast cure speeds. More particularly, this disclosure pertains to curable coating compositions that include acylgermane photoinitiators. Most particularly, this disclosure pertains to curable coating compositions for use as primary and secondary coatings in optical fiber.

BACKGROUND OF THE DISCLOSURE

The transmissivity of light through an optical fiber is highly dependent on the properties of the coatings applied to the fiber. The coatings typically include a primary coating and a secondary coating, where the secondary coating surrounds the primary coating and the primary coating contacts the glass fiber (which includes a central glass core surrounded by a glass cladding). The secondary coating is a harder material (higher Young's modulus) than the primary coating and is designed to protect the glass waveguide from damage caused by abrasion or external forces that arise during processing, handling, and installation of the fiber. The primary coating is a softer material (lower Young's modulus) and is designed to buffer or dissipates stresses that result from forces applied to the outer surface of the secondary coating. Dissipation of stresses within the primary coating attenuates the stress and minimizes the stress that reaches the glass waveguide. The primary coating is especially important in dissipating stresses that arise when the fiber is bent. The bending stresses transmitted to the glass waveguide on the fiber needs to be minimized because bending stresses create local perturbations in the refractive index profile of the glass waveguide. The local refractive index perturbations lead to intensity losses for the light transmitted through the waveguide. By dissipating stresses, the primary coating minimizes bend-induced intensity losses.

In fiber manufacture, primary and secondary coatings are formed on the fiber by applying viscous coating compositions to the fiber and curing the coating compositions with light to induce photochemical reactions that convert the coating compositions to rigid coatings. The fiber manufacture process is a continuous process in which a glass fiber is drawn from a heated glass preform and delivered to a process at a draw speed. The preform includes a central core region surrounded by one or more cladding regions. The drawn fiber is directed through processing units that control the rate of cooling to reduce attenuation. The size and shape of the fiber are also controlled to provide a fiber having a specified diameter and circular cross section. Once the fiber has been cooled sufficiently and sized, it is routed through a series of coating dies and curing stations that apply and cure the primary and secondary coating compositions. In a typical process, the primary coating composition is applied directly to the glass fiber and cured before applying and curing the secondary coating composition.

Driven by the high demand of optical network and cost savings, the draw speed for optical fiber manufacturing has increased significantly over the past few years. Advancements in coating compositions and curing are needed to enable higher draw speeds. The rate of curing of both the primary and secondary coating compositions are important consideration. The primary coating composition needs to be cured sufficiently fast to achieve a degree of cure having the tensile properties needed in a finished fiber before applying the secondary coating composition. Once the secondary coating composition is applied, it absorbs the curing light and attenuates the intensity of curing light transmitted to the underlying primary coating. Similarly, the secondary coating composition needs to cure sufficiently quickly to achieve adequate rigidity in limited process space so that the coated fiber can be wound on a spool for storage at the end of the fiber draw process.

A possible strategy for increasing the cure speed of the primary and secondary coating compositions is to add more curing lamps to the draw tower. This solution, however, is usually not feasible in practice because the space available for curing along the pathway of the draw process is limited and because the implementation of additional curing lamps is complex and costly.

Another strategy for increasing the cure speed is to increase the concentration of photoinitiator in the primary and secondary coating compositions. The photoinitiator initiates the photochemical reaction that leads to curing of the primary coating composition. A higher concentration of photoinitiator in principle should increase the rate of initiation of the curing reaction and the overall rate of curing of primary and secondary coating compositions. This approach, however, has several drawbacks, including solubility limits for the photoinitiator in the primary and secondary coating compositions, a reduction in the molecular weight of the primary and secondary coatings formed upon curing (and the resulting adverse effect on tensile properties), and higher costs.

New strategies are needed for increasing the rate of curing of primary and secondary coating compositions. The cure speeds of existing primary and secondary coating compositions are insufficient to enable meaningful improvements of current draw speeds. There is a need for new primary and secondary coating compositions that cure at faster rates while providing primary and secondary coatings having tensile properties needed for optical fibers.

SUMMARY

The present disclosure provides curable compositions that can be cured at fast rates as well as coatings and cured products formed from the curable compositions. The curable compositions include an acylgermane photoinitiator that leads to fast cure speeds. The curable compositions include primary coating compositions and secondary coating compositions. The primary and secondary coating compositions can be cured to form primary and secondary coatings of optical fibers. The primary coatings feature low Young's modulus and high tear strength. The primary coatings provide good microbending performance and are resistant to defect formation during the fiber draw process and subsequent handling operations. The secondary coatings feature high Young's modulus and good puncture resistance. The primary and secondary coatings can be formed on individual fibers or on each of multiple fibers in a ribbon. The curable compositions also include compositions that can be used to form a matrix for ribbons. The curable compositions can also be used to form cured films and other cured products used in applications outside the field of optical fibers.

The present description extends to:
A coating composition comprising:
   a radiation-curable monomer;
   an adhesion promoter, the adhesion promoter comprising an alkoxysilane compound or a mercapto-functional silane compound; and
   a photoinitiator, the photoinitiator comprising an acylgermane compound having the formula

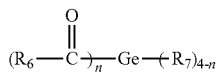

wherein $R_6$ and $R_7$ are independently H, an alkyl group, an aryl group, an amine group, or a halogen group; and n=1-4.

The present description extends to:
A method of forming a cured product comprising:
   curing a coating composition, the coating composition comprising:
      a radiation-curable monomer;
      an adhesion promoter, the adhesion promoter comprising an alkoxysilane compound or a mercapto-functional silane compound; and
      a photoinitiator, the photoinitiator comprising an acylgermane compound having the formula

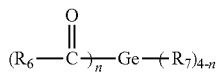

wherein $R_6$ and $R_7$ are independently H, an alkyl group, an aryl group, an amine group, or a halogen group; and n=1-4.

The present description extends to:
A method of forming an optical fiber comprising:
   drawing an optical fiber from a preform at a draw speed greater than 35 m/s; and
   while the optical fiber is moving at the draw speed, applying a coating composition to the optical fiber, the coating composition comprising: an acylgermane photoinitiator, the acylgermane photoinitiator having the formula

wherein $R_6$ and $R_7$ are independently H, an alkyl group, an aryl group, an amine group, or a halogen group; and n=1-4; and
   curing the coating composition.

The present description extends to:
A coating composition comprising:
   a first monomer with a radiation-curable group;
   a phosphine oxide photoinitiator; and
   an acylgermane photoinitiator, the acylgermane photoinitiator having the formula

wherein $R_6$ and $R_7$ are independently H, an alkyl group, an aryl group, an amine group, or a halogen group; and n=1-4.

The present disclosure further includes primary and secondary fiber coatings and cured products formed from the curable coating compositions described herein.

The present disclosure further includes an optical fiber coated with a coating formed from a curable coating composition disclosed herein, wherein the optical fiber includes a glass waveguide and the coating surrounds and is in direct contact with the glass waveguide.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
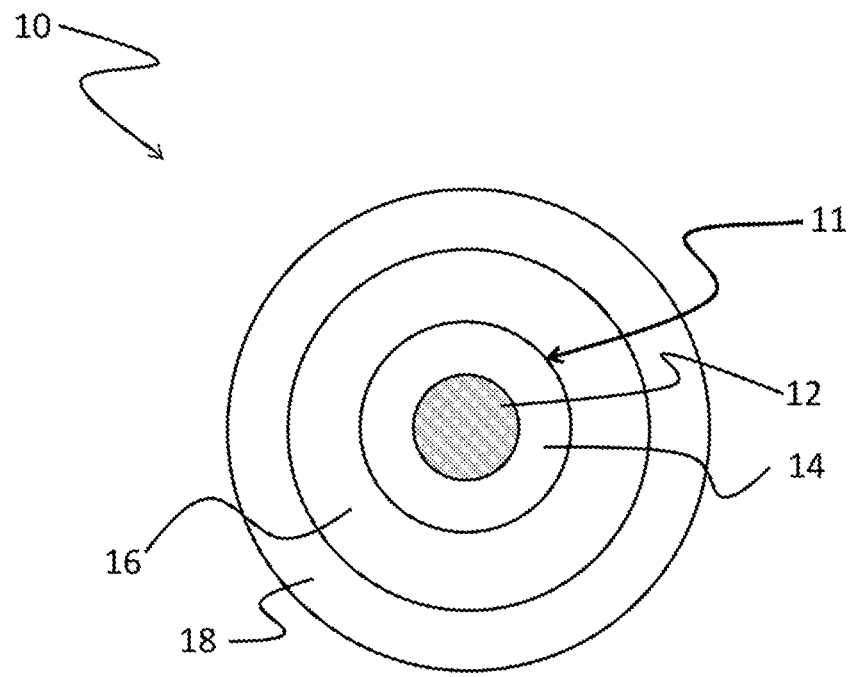
FIG. 1 is a schematic view of a coated optical fiber according one embodiment.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

In this specification and in the claims which follow, reference will be made to a number of terms which shall be defined to have the following meanings:

"Include," "includes," or like terms means encompassing but not limited to, that is, inclusive and not exclusive.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is said to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "about" further references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The coatings described herein are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition. The cured product is preferably a polymer. The curing process is induced by energy. Forms of energy include radiation or thermal energy. In a preferred embodiment, curing occurs with radiation, where radiation refers to electromagnetic radiation. Curing induced by radiation is referred to herein as radiation curing or photocuring. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum. The radiation curing reaction occurs in the presence of a photoinitiator. A radiation-curable component may also be thermally curable. Similarly, a thermally curable component is a component that can be induced to undergo a curing reaction when exposed to thermal energy of sufficient intensity for a sufficient period of time. A thermally curable component may also be radiation curable.

A curable component includes one or more curable functional groups. A curable component with only one curable functional group is referred to herein as a monofunctional curable component. A curable component having two or more curable functional groups is referred to herein as a multifunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Curable components include curable monomers and curable oligomers. Examples of functional groups that participate in covalent bond formation during the curing process are identified hereinafter.

The term "molecular weight" when applied to polyols means number average molecular weight ($M_n$).

The term "(meth)acrylate" means methacrylate, acrylate, or a combination of methacrylate and acrylate.

Values of Young's modulus, % elongation, and tear strength refer to values as determined under the measurement conditions by the procedures described herein.

Reference will now be made in detail to illustrative embodiments of the present description.

The present description relates to curable coating compositions, coatings formed from the curable coating compositions, and coated articles coated or encapsulated by the coating obtained by curing the curable coating compositions. In a preferred embodiment, the curable coating composition is a composition for forming coatings for optical fibers, the coating is an optical fiber coating, and the coated article is a coated optical fiber. The present description also relates to methods of making curable coating compositions, methods of forming coatings from the curable coating compositions, and methods of coating fibers with the curable coating composition.

One embodiment relates to a coated optical fiber. An example of a coated optical fiber is shown in schematic cross-sectional view in FIG. 1. Coated optical fiber 10 includes a glass optical fiber 11 surrounded by primary coating 16 and secondary coating 18. In a preferred embodiment, the primary coating 16 is the cured product of a curable coating composition in accordance with the present description.

The glass fiber 11 is an uncoated optical fiber including a core 12 and a cladding 14, as is familiar to the skilled artisan. Core 12 has a higher refractive index than cladding 14 and glass fiber 11 functions as a waveguide. In many applications, the core and cladding have a discernible core-cladding boundary. Alternatively, the core and cladding can lack a distinct boundary. One type of fiber is a step-index fiber. Another type of fiber is a graded-index fiber, which has a core whose refractive index varies with distance from the fiber center. A graded-index fiber is formed basically by diffusing the glass core and cladding layer into one another. The cladding can include one or more layers. The one or more cladding layers can include an inner cladding layer that surrounds the core and an outer cladding layer that surrounds the inner cladding layer. The inner cladding layer and outer cladding layer differ in refractive index. For example, the inner cladding layer may have a lower refractive index than the outer cladding layer. A depressed index layer may also be positioned between the inner cladding layer and outer cladding layer.

The optical fiber may also be single or multi-mode at the wavelength of interest, e.g., 1310 or 1550 nm. The optical fiber may be adapted for use as a data transmission fiber (e.g. SMF-28®, LEAF®, and METROCOR®, each of which is available from Corning Incorporated of Corning, N.Y.) Alternatively, the optical fiber may perform an amplification, dispersion compensation, or polarization maintenance function. The skilled artisan will appreciate that the coatings described herein are suitable for use with virtually any optical fiber for which protection from the environment is desired.

The primary coating 16 preferably has a higher refractive index than the cladding of the optical fiber in order to allow it to strip errant optical signals away from the optical fiber core. The primary coating should maintain adequate adhesion to the glass fiber during thermal and hydrolytic aging, yet be strippable from the glass fiber for splicing purposes. The primary coating 16 and secondary coating 18 typically have a thickness in the range of 15-40 m. Primary and secondary coatings are typically formed by applying a curable coating composition to the glass fiber as a viscous liquid and curing. The fiber may also include a tertiary coating (not shown) that surrounds the secondary coating. The tertiary coating may include pigments, inks or other coloring agents to mark the optical fiber for identification purposes and typically has a Young's modulus similar to the Young's modulus of the secondary coating.

Figure 2:
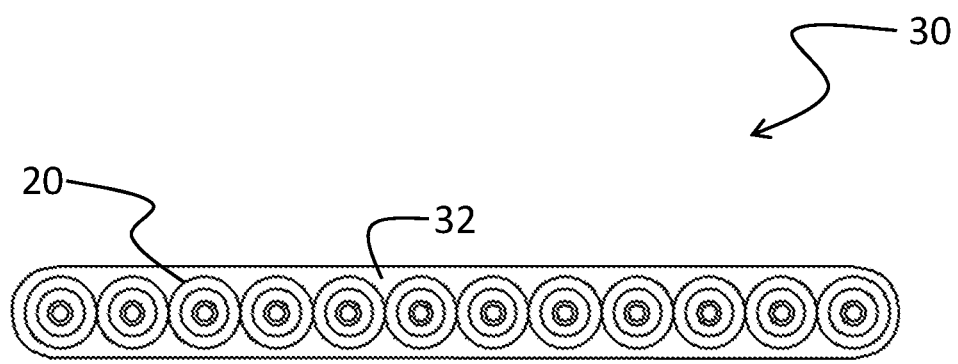
FIG. 2 is a schematic view of a representative optical fiber ribbon. The representative optical fiber ribbon includes twelve coated optical fibers.

FIG. 2 illustrates an optical fiber ribbon 30. The ribbon 30 includes a plurality of optical fibers 20 and a matrix 32 encapsulating the plurality of optical fibers. Optical fibers 20 include a core glass region, a cladding glass region, a primary coating, and a secondary coating as described above. Optical fibers 20 may also include a tertiary coating as noted above. The secondary coating may include a pigment. The optical fibers 20 are aligned relative to one another in a substantially planar and parallel relationship. The optical fibers in fiber optic ribbons are encapsulated by the ribbon matrix 32 in any known configuration (e.g., edge-bonded ribbon, thin-encapsulated ribbon, thick-encapsulated ribbon, or multi-layer ribbon) by conventional methods of making fiber optic ribbons. In FIG. 2, the fiber optic ribbon 30 contains twelve (12) optical fibers 20; however, it should be apparent to those skilled in the art that any number of optical fibers 20 (e.g., two or more) may be employed to form fiber optic ribbon 30 disposed for a particular use. The ribbon matrix 32 can be formed from the same composition used to prepare a secondary coating, or the ribbon matrix 32 can be formed from a different composition that is otherwise compatible for use.

The curable compositions disclosed herein include a photoinitiator, one or more curable components, and optionally one or more additives. Further details on curable compositions used for primary and secondary coatings are provided below.

Photoinitiators.

Phosphine oxide photoinitiators are widely used to initiate curing in radiation-curable primary and secondary coating compositions. Representative phosphine oxide photoinitiators include MAPO (diphenyl(2,4,6-trimethylbenzoyl) phosphine oxide) and BAPO (phenylbis(2,4,6-trimethylbenzoyl) phosphine oxide), which have the molecular structures (I) and (II) shown below:

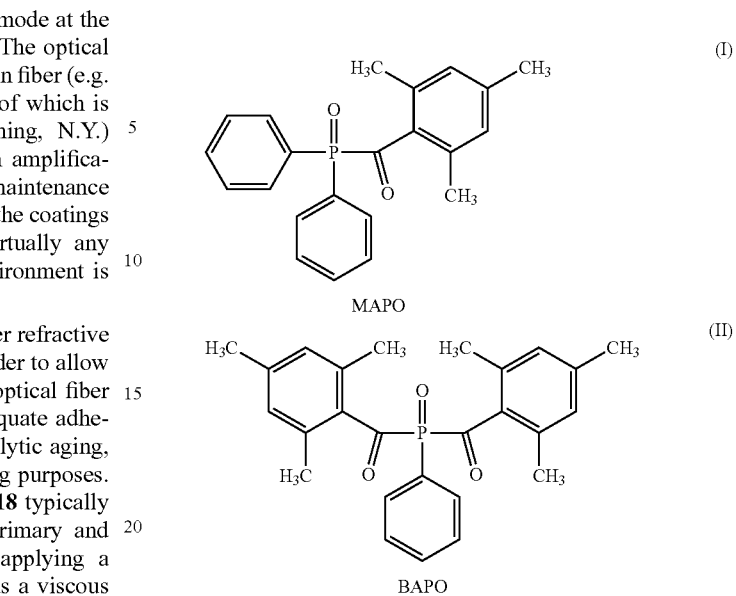

The phosphine oxide photoinitiators have provided satisfactory cure speeds for draw speeds up to about 40 m/s, but are becoming unsatisfactory as higher draw speeds are being implemented. Efforts to increase cure speeds by increasing the concentration of phosphine oxide photoinitiator in primary and secondary coating compositions have not been successful because of solubility limits.

The photoinitiators used in the curable coating compositions disclosed herein are germane compounds that offer higher cure speeds of primary and secondary coating compositions than the common phosphine oxide precursors at similar concentrations. Preferred germane compounds are acylgermane compounds. The acylgermane compounds have the general formula (III)

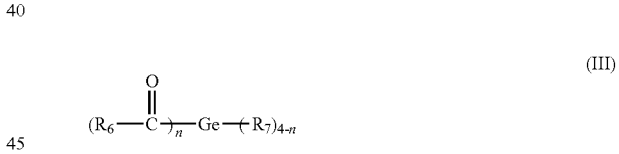

where $R_6$ and $R_7$ are independently H, an alkyl group, an aryl group, an amine group, or a halogen group; and n=1-4. As used herein, "independently" means that different occurrences of $R_6$ and $R_7$ in the same molecule may be the same or different. For example, when n=2, two occurrences of $R_6$ and two occurrences of $R_7$ are present in the molecule. The two occurrences of $R_6$ may be the same or different, the two occurrences of $R_7$ may be the same or different, and the occurrences of $R_6$ and $R_7$ may be the same or different. Alkyl groups are linear, branched, or cyclic. Alkyl and aryl groups include from 1-20 carbon atoms, or from 2-14 carbon atoms, or from 3-10 carbon atoms. Aryl groups preferably include a six-membered ring, which is unsubstituted or substituted. Preferred substituents for aryl groups include one or more alkyl groups. In one embodiment, $R_6$ is an aryl group and $R_7$ is an alkyl group. In another embodiment, n is 1 or 2. For purposes of the present disclosure, formyl groups are regarded as acyl groups.

Representative acylgermane photoinitiators include the compounds with formulas (IV)-(XIB) below.

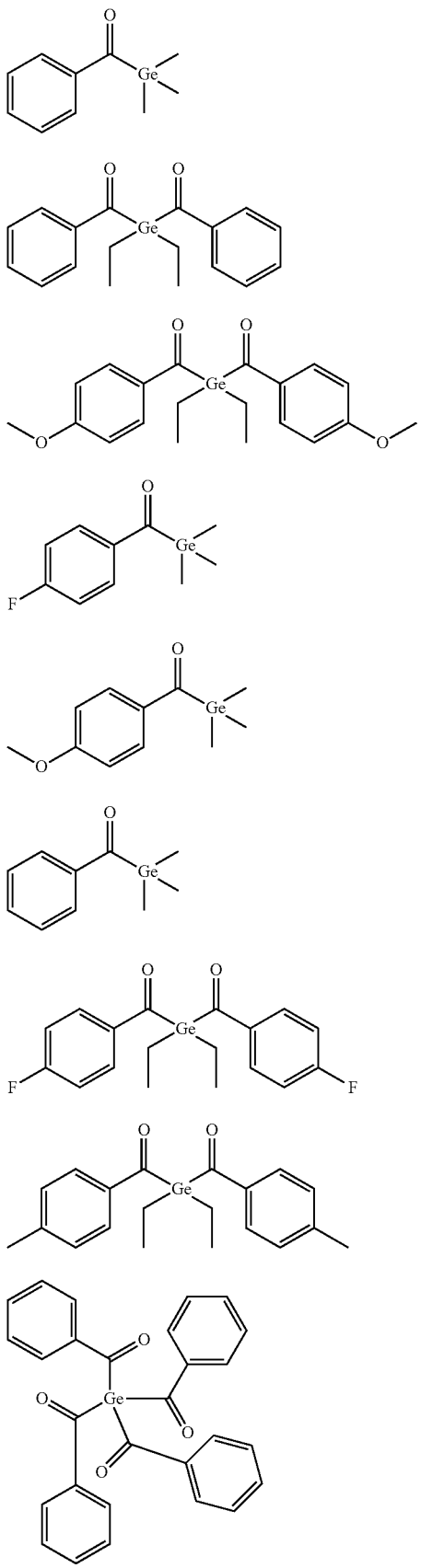

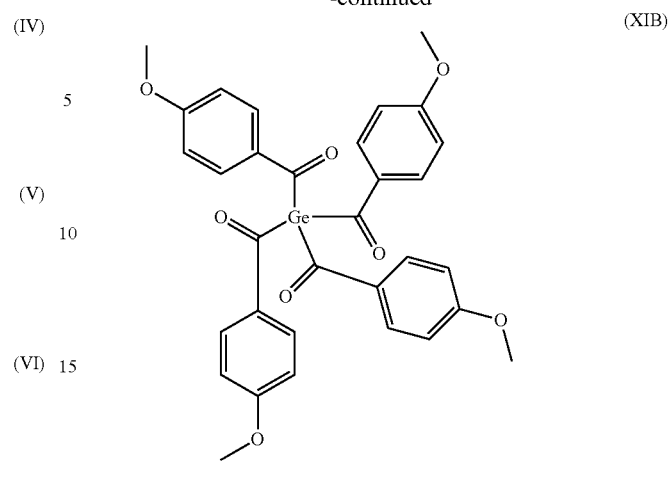

Figure 3:
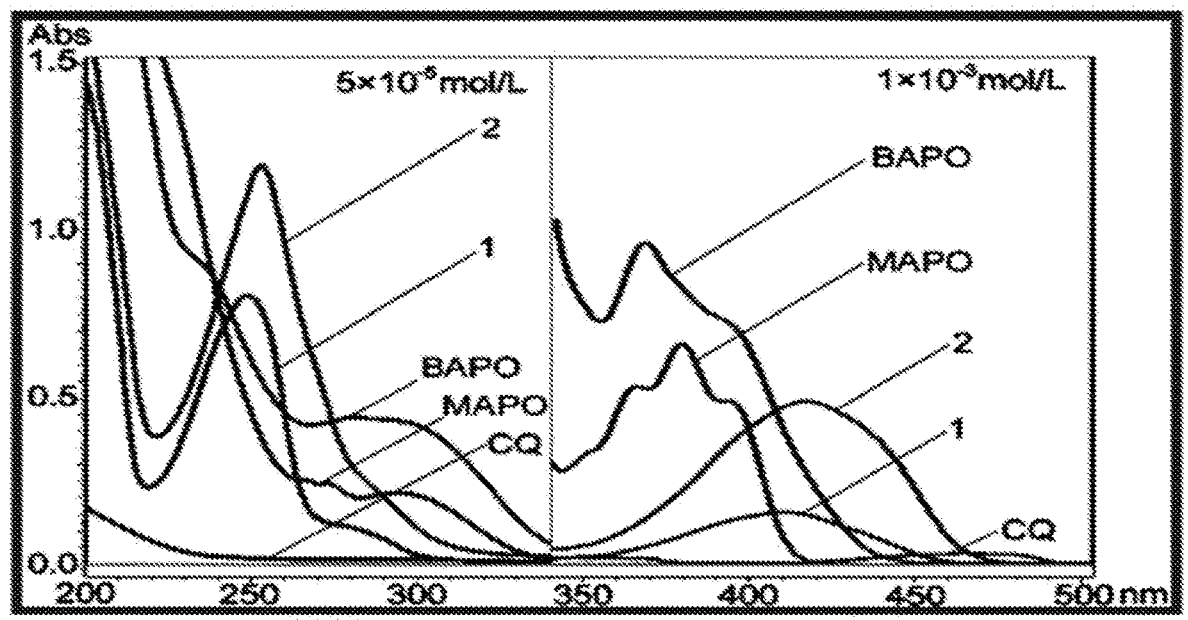
FIG. 3 shows absorption spectra of several photoinitiators over the wavelength range 200 nm-500 nm.

FIG. 3 compares absorption spectra of two acylgermane compounds to absorption spectra of MAPO, BAPO, and CQ (camphorquinone). The two acylgermane compounds had molecular formulas IV (labeled "1" in FIG. 3) and V (labeled "2" in FIG. 3) shown above.

The wavelength of radiation for exciting the acylgermane photoinitiators is infrared, visible or ultraviolet (UV). Representative wavelengths include wavelengths in the range from 200 nm-1000 nm, or in the range from 225 nm-750 nm, or in the range from 250 nm-500 nm, or in the range from 275 nm-450 nm, or in the range from 300 nm-425 nm, or in the range from 325 nm-410 nm, or in the range from 335 nm-410 nm, or in the range from 345 nm-410 nm, or in the range from 355 nm-405 nm. Curing can be accomplished with light sources that include a lamp source (e.g. Hg lamp, tungsten-halogen lamp), an LED source (e.g. a UVLED, visible LED, or infrared LED), or a laser source.

The curable coating composition includes a single acylgermane photoinitiator or a combination of two or more acylgermane photoinitiators. The total acylgermane photoinitiator concentration in the curable coating composition is greater than 0.25 wt %, or greater than 0.50 wt %, or greater than 0.75 wt %, or greater than 1.0 wt %, or in the range from 0.25 wt %-5.0 wt %, or in the range from 0.50 wt %-4.0 wt %, or in the range from 0.75 wt %-3.0 wt %. In some embodiments, the curable coating composition includes an acyl germane photoinitiator and a phosphine oxide photoinitiator.

Primary Coating Compositions.

In one aspect, the curable coating compositions provide a primary coating for optical fibers that exhibits low Young's modulus, low pullout force, and strong cohesion. The curable coating compositions further enable formation of a primary coating that features clean strippability and high resistance to defect formation during the stripping operation. Low pullout force facilitates clean stripping of the primary coating with minimal residue and strong cohesion inhibits initiation and propagation of defects in the primary coating when it is subjected to stripping forces.

The primary coating is a cured product of a radiation-curable primary coating composition that includes an oligomer, a monomer, an acylgermane photoinitiator and, optionally, an additive. The present disclosure describes oligomers for the radiation-curable primary coating compositions, radiation-curable primary coating compositions containing at least one of the oligomers, cured products of the radiation-curable primary coating compositions that include at least one of the oligomers, optical fibers coated with a radiation-curable primary coating composition containing at least one of the oligomers, and optical fibers coated with the cured product of a radiation-curable primary coating composition containing at least one of the oligomers.

The oligomer preferably includes a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups.

A preferred diisocyanate compound is represented by molecular formula (XII):

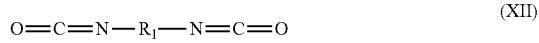
(XII)

which includes two terminal isocyanate groups separated by a linkage group $R_1$. In one embodiment, the linkage group $R_1$ includes an alkylene group. The alkylene group of linkage group $R_1$ is linear (e.g. methylene or ethylene), branched (e.g. isopropylene), or cyclic (e.g. cyclohexylene, phenylene). The cyclic group is aromatic or non-aromatic. In some embodiments, the linkage group $R_1$ is 4,4'-methylene bis(cyclohexyl) group and the diisocyanate compound is 4,4'-methylene bis(cyclohexyl isocyanate). In some embodiments, the linkage group $R_1$ lacks an aromatic group, or lacks a phenylene group, or lacks an oxyphenylene group.

The polyol is represented by molecular formula (XIII):

(XIII)

where $R_2$ includes an alkylene group, —O—$R_2$— is a repeating alkoxylene group, and x is an integer. Preferably, x is greater than 20, or greater than 40, or greater than 50, or greater than 75, or greater than 100, or greater than 125, or greater than 150, or in the range from 20-500, or in the range from 20-300, or in the range from 30-250, or in the range from 40-200, or in the range from 60-180, or in the range from 70-160, or in the range from 80-140. $R_2$ is preferably a linear or branched alkylene group, such as methylene, ethylene, propylene (normal, iso or a combination thereof), or butylene (normal, iso, secondary, tertiary, or a combination thereof). The polyol may be a polyalkylene oxide, such as polyethylene oxide, or a polyalkylene glycol, such as polypropylene glycol. Polypropylene glycol is a preferred polyol. The molecular weight of the polyol is greater than 1000 g/mol, or greater than 2500 g/mol, or greater than 5000 g/mol, or greater than 7500 g/mol, or greater than 10000 g/mol, or in the range from 1000 g/mol-20000 g/mol, or in the range from 2000 g/mol-15000 g/mol, or in the range from 2500 g/mol-12500 g/mol, or in the range from 2500 g/mol-10000 g/mol, or in the range from 3000 g/mol-7500 g/mol, or in the range from 3000 g/mol-6000 g/mol, or in the range from 3500 g/mol-5500 g/mol. In some embodiments, the polyol is polydisperse and includes molecules spanning a range of molecular weights such that the totality of molecules combines to provide the number average molecular weight specified hereinabove.

The unsaturation of the polyol is less than 0.25 meq/g, or less than 0.15 meq/g, or less than 0.10 meq/g, or less than 0.08 meq/g, or less than 0.06 meq/g, or less than 0.04 meq/g, or less than 0.02 meq/g, or less than 0.01 meq/g, or less than 0.005 meq/g, or in the range from 0.001 meq/g-0.15 meq/g, or in the range from 0.005 meq/g-0.10 meq/g, or in the range from 0.01 meq/g-0.10 meq/g, or in the range from 0.01 meq/g-0.05 meq/g, or in the range from 0.02 meq/g-0.10 meq/g, or in the range from 0.02 meq/g-0.05 meq/g. As used herein, unsaturation refers to the value determined by the standard method reported in ASTM D4671-16. In the method, the polyol is reacted with mercuric acetate and methanol in a methanolic solution to produce acetoxymercuricmethoxy compounds and acetic acid. The reaction of the polyol with mercuric acetate is equimolar and the amount of acetic acid released is determined by titration with alcoholic potassium hydroxide to provide the measure of unsaturation used herein. To prevent interference of excess mercuric acetate on the titration of acetic acid, sodium bromide is added to convert mercuric acetate to the bromide.

The reaction to form the oligomer further includes addition of a hydroxy acrylate compound to react with terminal isocyanate groups present in unreacted starting materials (e.g. the diisocyanate compound) or products formed in the reaction of the diisocyanate compound with the polyol (e.g. urethane compounds with terminal isocyanate groups). The hydroxy acrylate compound reacts with terminal isocyanate groups to provide terminal acrylate groups for one or more constituents of the oligomer. In some embodiments, the hydroxy acrylate compound is present in excess of the amount needed to fully convert terminal isocyanate groups to terminal acrylate groups. The oligomer includes a single polyether urethane acrylate compound or a combination of two or more polyether urethane acrylate compounds.

The hydroxy acrylate compound is represented by molecular formula (XIV):

(XIV)

where $R_3$ includes an alkylene group. The alkylene group of $R_3$ is linear (e.g. methylene or ethylene), branched (e.g. isopropylene), or cyclic (e.g. phenylene). In some embodiments, the hydroxy acrylate compound includes substitution of the ethylenically unsaturated group of the acrylate group. Substituents of the ethylenically unsaturated group include alkyl groups. An example of a hydroxy acrylate compound with a substituted ethylenically unsaturated group is a hydroxy methacrylate compound. The discussion that follows describes hydroxy acrylate compounds. It should be understood, however, that the discussion applies to substituted hydroxy acrylate compounds and in particular to hydroxy methacrylate compounds.

In different embodiments, the hydroxy acrylate compound is a hydroxyalkyl acrylate, such as 2-hydroxyethyl acrylate. The hydroxy acrylate compound may include water at residual or higher levels. The presence of water in the hydroxy acrylate compound may facilitate reaction of isocyanate groups to reduce the concentration of unreacted isocyanate groups in the final reaction composition. In various embodiments, the water content of the hydroxy acrylate compound is at least 300 ppm, or at least 600 ppm, or at least 1000 ppm, or at least 1500 ppm, or at least 2000 ppm, or at least 2500 ppm.

In the foregoing exemplary molecular formulas (XII), (XIII), and (XIV), the groups $R_1$, $R_2$, and $R_3$ independently are all the same, are all different, or include two groups that are the same and one group that is different.

The diisocyanate compound, hydroxy acrylate compound and polyol are combined simultaneously and reacted, or are combined sequentially (in any order) and reacted. In one embodiment, the oligomer is formed by reacting a diisocyanate compound with a hydroxy acrylate compound and reacting the resulting product composition with a polyol. In another embodiment, the oligomer is formed by reacting a diisocyanate compound with a polyol compound and reacting the resulting product composition with a hydroxy acrylate compound.

The oligomer is formed from a reaction of a diisocyanate compound, a hydroxy acrylate compound, and a polyol, where the molar ratio of the diisocyanate compound to the hydroxy acrylate compound to the polyol in the reaction process is n:m:p. n, m, and p are referred to herein as mole numbers or molar proportions of diisocyanate, hydroxy acrylate, and polyol; respectively. The mole numbers n, m and p are positive integer or positive non-integer numbers.

reaction of the diisocyanate compound and the polyol. The hydroxy acrylate compound is added as a single aliquot or multiple aliquots. In one embodiment, an initial aliquot of hydroxy acrylate is included in the reaction mixture used to form the oligomer and the product composition formed can be tested for the presence of unreacted isocyanate groups (e.g. using FTIR spectroscopy to detect the presence of isocyanate groups). Additional aliquots of hydroxy acrylate compound may be added to the product composition to stoichiometrically react with unreacted isocyanate groups (using, for example, FTIR spectroscopy to monitor a decrease in a characteristic isocyanate frequency (e.g. at 2260 $cm^{-1}$-2270 $cm^{-1}$) as isocyanate groups are converted by the hydroxy acrylate compound). In alternate embodiments, aliquots of hydroxy acrylate compound in excess of the amount needed to stoichiometrically react with unreacted isocyanate groups are added. As described more fully below, for a given value of p, the ratio of the mole number m to the mole number n influences the relative proportions of polyether urethane diacrylate compound and di-adduct compound in the oligomer and differences in the relative proportions of polyether urethane diacrylate compound and di-adduct compound lead to differences in the tear strength and/or critical stress of coatings formed from the oligomer.

In one embodiment, the oligomer is formed from a reaction mixture that includes 4,4'-methylene bis(cyclohexyl isocyanate), 2-hydroxyethyl acrylate, and polypropylene glycol in the molar ratios n:m:p as specified above, where the polypropylene glycol has a number average molecular weight in the range from 2500 g/mol-6500 g/mol, or in the range from 3000 g/mol-6000 g/mol, or in the range from 3500 g/mol-5500 g/mol.

The oligomer includes two components. The first component is a polyether urethane diacrylate compound having the molecular formula (XV):

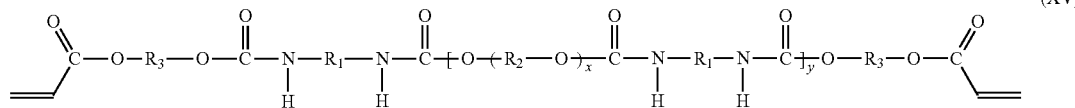

(XV)

In embodiments, when p is 2.0, n is in the range from 3.0-5.0, or in the range from 3.2-4.8, or in the range from 3.4-4.6, or in the range from 3.5-4.4, or in the range from 3.6-4.2, or in the range from 3.7-4.0; and m is in the range from 1.5-4.0, or in the range from 1.6-3.6, or in the range from 1.7-3.2, or in the range from 1.8-2.8, or in the range from 1.9-2.4. For values of p other than 2.0, the molar ratio n:m:p scales proportionally. For example, the molar ratio n:m:p=4.0:3.0:2.0 is equivalent to the molar ratio n:m:p=2.0:1.5:1.0.

The mole number m may be selected to provide an amount of the hydroxy acrylate compound to stoichiometrically react with unreacted isocyanate groups present in the product composition formed from the reaction of diisocyanate compound and polyol used to form the oligomer. The isocyanate groups may be present in unreacted diisocyanate compound (unreacted starting material) or in isocyanate-terminated urethane compounds formed in reactions of the diisocyanate compound with the polyol. Alternatively, the mole number m may be selected to provide an amount of the hydroxy acrylate compound in excess of the amount needed to stoichiometrically react with any unreacted isocyanate groups present in the product composition formed from and the second component is a di-adduct compound having the molecular formula (XVI):

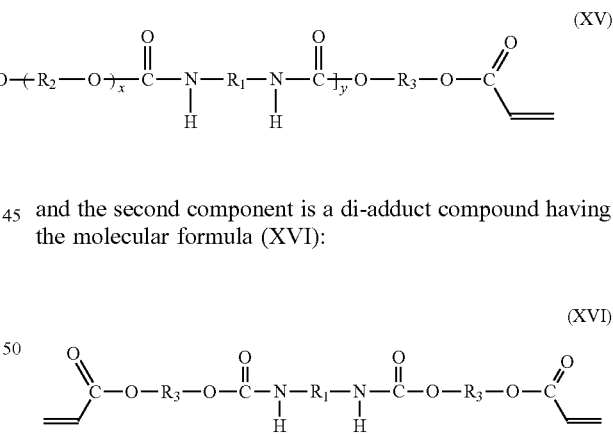

(XVI)

where the groups $R_1$, $R_2$, $R_3$, and the integer x are as described hereinabove, y is a positive integer, and it is understood that the group $R_1$ in molecular formulas (XV) and (XVI) is the same as group $R_1$ in molecular formula (XII), the group $R_2$ in molecular formula (XV) is the same as group $R_2$ in molecular formula (XIII), and the group $R_3$ in molecular formulas (XV) and (XVI) is the same as group $R_3$ in molecular formula (XIV). The di-adduct compound corresponds to the compound formed by reaction of both terminal isocyanate groups of the diisocyanate compound of molecular formula (XII) with the hydroxy acrylate compound of molecular formula (XIV) where the diisocyanate compound has undergone no reaction with the polyol of molecular formula (XIII).

The di-adduct compound is formed from a reaction of the diisocyanate compound with the hydroxy acrylate compound during the reaction used to form the oligomer. Alternatively, the di-adduct compound is formed independent of the reaction used to form the oligomer and is added to the product of the reaction used to form the polyether urethane diacrylate compound or to a purified form of the polyether urethane diacrylate compound. The hydroxy group of the hydroxy acrylate compound reacts with an isocyanate group of the diisocyanate compound to provide a terminal acrylate group. The reaction occurs at each isocyanate group of the diisocyanate compound to form the di-adduct compound. The di-adduct compound is present in the oligomer in an amount of at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt %-10.0 wt %, or in the range from 2.0 wt %-9.0 wt %, or in the range from 2.5 wt %-6.0 wt %, or in the range from 3.0 wt %-8.0 wt %, or in the range from 3.0 wt % to 5.0 wt %, or in the range from 3.0 wt %-5.5 wt %, or in the range from 3.5 wt %-5.0 wt %, or in the range from 3.5 wt % to 7.0 wt %. It is noted that the concentration of di-adduct is expressed in terms of wt % of the oligomer and not in terms of wt % in the coating composition.

An illustrative reaction for synthesizing an oligomer in accordance with the present disclosure includes reaction of a diisocyanate compound (4,4'-methylene bis(cyclohexyl isocyanate, which is also referred to herein as H12MDI) and a polyol (polypropylene glycol with $M_n$~4000 g/mol, which is also referred to herein as PPG4000) to form a polyether urethane diisocyanate compound with formula (XVII):

H12MDI~PPG4000~H12MDI~PPG4000~H12MDI (XVII)

where "~" denotes a urethane linkage formed by the reaction of a terminal isocyanate group of H12MDI with a terminal alcohol group of PPG4000 and ~H12MDI, ~H12MDI~, and ~PPG4000~ refer to residues of H12MDI and PPG4000 remaining after the reaction. The polyether urethane diisocyanate compound has a repeat unit of the type ~(H12MDI~PPG4000)~. The particular polyether urethane diisocyanate shown includes two PPG4000 units. The reaction may also provide products having one PPG4000 unit, or three or more PPG4000 units. The polyether urethane diisocyanate and any unreacted H12MDI include terminal isocyanate groups. In accordance with the present disclosure, a hydroxy acrylate compound (such as 2-hydroxyethyl acrylate, which is referred to herein as HEA) is included in the reaction to react with terminal isocyanate groups to convert them to terminal acrylate groups. The conversion of terminal isocyanate groups to terminal acrylate groups effects a quenching of the isocyanate group. The amount of HEA included in the reaction may be an amount estimated to react stoichiometrically with the expected concentration of unreacted isocyanate groups or an amount in excess of the expected stoichiometric amount. Reaction of HEA with the polyether urethane diisocyanate compound forms the polyether urethane acrylate compound with formula (XVIII):

HEA~H12MDI~PPG4000~H12MDI~PPG4000~H12MDI (XVIII)

and/or the polyether urethane diacrylate compound with formula (XIX):

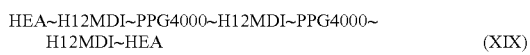

HEA~H12MDI~PPG4000~H12MDI~PPG4000~
H12MDI~HEA (XIX)

and reaction of HEA with unreacted H12MDI forms the di-adduct compound with formula (XX):

HEA~H12MDI~HEA (XX)

where, as above, ~ designates a urethane linkage and ~HEA designates the residue of HEA remaining after reaction to form the urethane linkage (consistent with formulas (XV) and (XVI)). The combination of a polyether urethane diacrylate compound and a di-adduct compound in the product composition constitutes an oligomer in accordance with the present disclosure. As described more fully hereinbelow, when one or more oligomers are used in coating compositions, coatings having improved tear strength and critical stress characteristics result. In particular, it is demonstrated that oligomers having a high proportion of di-adduct compound provide coatings with high tear strengths and/or high critical stress values.

Although depicted for the illustrative combination of H12MDI, HEA and PPG4000, the foregoing reaction may be generalized to an arbitrary combination of a diisocyanate compound, a hydroxy acrylate compound, and a polyol, where the hydroxy acrylate compound reacts with terminal isocyanate groups to form terminal acrylate groups and where urethane linkages form from reactions of isocyanate groups and alcohol groups of the polyol or hydroxy acrylate compound.

The oligomer includes a compound that is a polyether urethane diacrylate compound with formula (XXI):

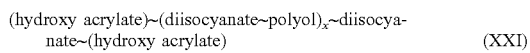

(hydroxy acrylate)~(diisocyanate~polyol)$_x$~diisocyanate~(hydroxy acrylate) (XXI)

and a compound that is a di-adduct compound with formula (XXII):

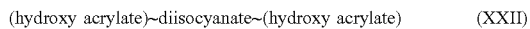

(hydroxy acrylate)~diisocyanate~(hydroxy acrylate) (XXII)

where the relative proportions of diisocyanate compound, hydroxy acrylate compound, and polyol used in the reaction to form the oligomer correspond to the mole numbers n, m, and p disclosed hereinabove.

Compounds represented by molecular formulas (XII) and (XIII) above, for example, react to form a polyether urethane diisocyanate compound represented by molecular formula (XXIII):

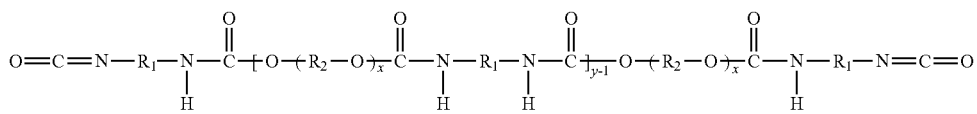

(XXIII)

where y is the same as y in formula (XV) and is 1, or 2, or 3 or 4 or higher; and x is determined by the number of repeat units of the polyol (as described hereinabove).

Further reaction of the polyether urethane isocyanate of molecular formula (XVII) with the hydroxy acrylate of molecular formula (XIV) provides the polyether urethane diacrylate compound represented by molecular formula (XV) referred to hereinabove and repeated below:

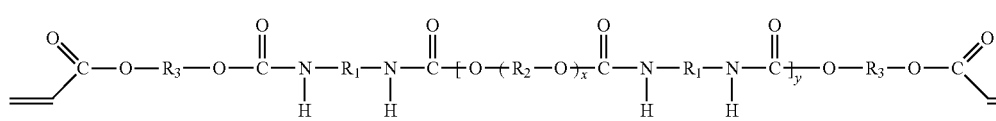

where y is 1, or 2, or 3, or 4 or higher; and x is determined by the number of repeat units of the polyol (as described hereinabove).

In an embodiment, the reaction between the diisocyanate compound, hydroxy acrylate compound, and polyol yields a series of polyether urethane diacrylate compounds that differ in y such that the average value of y over the distribution of compounds present in the final reaction mixture is a non-integer. In an embodiment, the average value of y in the polyether urethane diisocyanates and polyether urethane diacrylates of molecular formulas (XVII) and (XV) corresponds to p or p−1 (where p is as defined hereinabove). In an embodiment, the average number of occurrences of the group $R_1$ in the polyether urethane diisocyanates and polyether urethane diacrylates of the molecular formulas (XXIII) and (XV) correspond to n (where n is as defined hereinabove).

The relative proportions of the polyether urethane diacrylate and di-adduct compounds produced in the reaction are controlled by varying the molar ratio of the mole numbers n, m, and p. By way of illustration, the case where p=2.0 is considered. In the theoretical limit of complete reaction, two equivalents p of polyol would react with three equivalents n of a diisocyanate to form a compound having molecular formula (XVII) in which y=2. The compound includes two terminal isocyanate groups, which can be quenched with subsequent addition of two equivalents m of a hydroxy acrylate compound in the theoretical limit to form the corresponding polyether urethane diacrylate compound (XV) with y=2. A theoretical molar ratio n:m:p=3.0:2.0:2.0 is defined for this situation.

In the foregoing exemplary theoretical limit, a reaction of diisocyanate, hydroxy acrylate, and polyol in the theoretical molar ratio n:m:p=3.0:2.0:2.0 provides a polyether urethane diacrylate compound having molecular formula (XV) in which y=2 without forming a di-adduct compound. Variations in the mole numbers n, m, and p provide control over the relative proportions of polyether urethane diacrylate and di-adduct formed in the reaction. Increasing the mole number n relative to the mole number m or the mole number p, for example, may increase the amount of di-adduct compound formed in the reaction. Reaction of the diisocyanate compound, the hydroxy acrylate compound, and polyol compound in molar ratios n:m:p, where n is in the range from 3.0-5.0, m is in the range within ±15% of 2n-4 or within ±10% of 2n-4 or within ±5% of 2n-4, and p is 2.0, for example, produce amounts of the di-adduct compound in the oligomer sufficient to achieve the preferred primary coating properties. By way of example, the embodiment in which n=4.0, m is within ±15% of 2n-4, and p=2.0 means that n=4.0, m is within ±15% of 4, and p=2.0, which means that that n=4.0, m is in the range from 3.4-4.6, and p=2.0.

Variations in the relative proportions of di-adduct and polyether urethane diacrylate are obtained through changes in the mole numbers n, m, and p and through such variations, it is possible to precisely control the tear strength, critical stress, tensile toughness, and other mechanical properties of coatings formed from coating compositions that include the oligomer. In one embodiment, control over properties is achievable by varying the number of units of polyol in the polyether urethane diacrylate compound (e.g. p=2.0 vs. p=3.0 vs. p=4.0). In another embodiment, control of tear strength, tensile toughness, and other mechanical properties is achieved by varying the proportions polyether urethane diacrylate compound and di-adduct compound. For a polyether urethane compound with a given number of polyol units, oligomers having variable proportions of di-adduct compound can be prepared. The variability in proportion of di-adduct compound can be finely controlled to provide oligomers based on a polyether urethane diacrylate compound with a fixed number of polyol units that provide coatings that offer precise or targeted values of tear strength, critical stress, tensile toughness, or other mechanical properties.

Improved fiber primary coatings result when utilizing a primary coating composition that incorporates an oligomer that includes a polyether urethane acrylate compound represented by molecular formula (XV) and a di-adduct compound represented by molecular formula (XVI), where concentration of the di-adduct compound in the oligomer is at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt %-10.0 wt %, or in the range from 2.0 wt % to 9.0 wt %, or in the range from 3.0 wt % to 8.0 wt %, or in the range from 3.5 wt % to 7.0 wt % or in the range from 2.5 wt % to 6.0 wt %, or in the range from 3.0 wt % to 5.5 wt %, or in the range from 3.5 wt % to 5.0 wt %. It is noted that the concentration of di-adduct is expressed in terms of wt % of the oligomer and not in terms of wt % in the coating composition. The concentration of the di-adduct compound is increased in one embodiment by varying the molar ratio n:m:p of diisocyanate:hydroxy acrylate:polyol. In one aspect, molar ratios n:m:p that are rich in diisocyanate relative to polyol promote the formation of the di-adduct compound.

In the exemplary stoichiometric ratio n:m:p=3:2:2 described hereinabove, the reaction proceeds with p equivalents of polyol, n=p+1 equivalents of diisocyanate, and two equivalents of hydroxy acrylate. If the mole number n exceeds p+1, the diisocyanate compound is present in excess relative to the amount of polyol compound needed to form the polyether urethane acrylate of molecular formula (XV). The presence of excess diisocyanate shifts the distribution of reaction products toward enhanced formation of the di-adduct compound.

To promote formation of the di-adduct compound from excess diisocyanate compound, the amount of hydroxy acrylate can also be increased. For each equivalent of diisocyanate above the stoichiometric mole number n=p+1, two equivalents of hydroxy acrylate are needed to form the di-adduct compound. In the case of arbitrary mole number p (polyol), the stoichiometric mole numbers n (diisocyanate) and m (hydroxy acrylate) are p+1 and 2, respectively. As the mole number n is increased above the stoichiometric value, the equivalents of hydroxy acrylate needed for complete reaction of excess diisocyanate to form the di-adduct compound may be expressed as m=2+2[n−(p+1)], where the leading term "2" represents the equivalents of hydroxy acrylate needed to terminate the polyether urethane acrylate compound (compound having molecular formula (XVI)) and the term 2[n−(p+1)] represents the equivalents of hydroxy acrylate needed to convert the excess starting diisocyanate to the di-adduct compound. If the actual value of the mole number m is less than this number of equivalents, the available hydroxy acrylate reacts with isocyanate groups present on the oligomer or free diisocyanate molecules to form terminal acrylate groups. The relative kinetics of the two reaction pathways dictates the relative amounts of polyether urethane diacrylate and di-adduct compounds formed and the deficit in hydroxy acrylate relative to the amount required to quench all unreacted isocyanate groups may be controlled to further influence the relative proportions of polyether urethane diacrylate and di-adduct formed in the reaction.

In some embodiments, the reaction includes heating the reaction composition formed from the diisocyanate compound, hydroxy acrylate compound, and polyol. The heating facilitates conversion of terminal isocyanate groups to terminal acrylate groups through a reaction of the hydroxy acrylate compound with terminal isocyanate groups. In different embodiments, the hydroxy acrylate compound is present in excess in the initial reaction mixture and/or is otherwise available or added in unreacted form to effect conversion of terminal isocyanate groups to terminal acrylate groups. The heating occurs at a temperature above 40° C. for at least 12 hours, or at a temperature above 40° C. for at least 18 hours, or at a temperature above 40° C. for at least 24 hours, or at a temperature above 50° C. for at least 12 hours, or at a temperature above 50° C. for at least 18 hours, or at a temperature above 50° C. for at least 24 hours, or at a temperature above 60° C. for at least 12 hours, or at a temperature above 60° C. for at least 18 hours, or at a temperature above 60° C. for at least 24 hours.

In an embodiment, conversion of terminal isocyanate groups on the polyether urethane diacrylate compound or starting diisocyanate compound (unreacted initial amount or amount present in excess) to terminal acrylate groups is facilitated by the addition of a supplemental amount of hydroxy acrylate compound to the reaction mixture. As indicated hereinabove, the amount of hydroxy acrylate compound needed to quench (neutralize) terminal isocyanate groups may deviate from the theoretical number of equivalents due, for example, to incomplete reaction or a desire to control the relative proportions of polyether urethane diacrylate compound and di-adduct compound. As described hereinabove, once the reaction has proceeded to completion or other endpoint, it is preferable to quench (neutralize) residual isocyanate groups to provide a stabilized reaction product. In an embodiment, supplemental hydroxy acrylate is added to accomplish this objective.

In an embodiment, the amount of supplemental hydroxy acrylate compound is in addition to the amount included in the initial reaction process. The presence of terminal isocyanate groups at any stage of the reaction is monitored, for example, by FTIR spectroscopy (e.g. using a characteristic isocyanate stretching mode near 2265 cm$^1$) and supplemental hydroxy acrylate compound is added as needed until the intensity of the characteristic stretching mode of isocyanate groups is negligible or below a pre-determined threshold. In an embodiment, supplemental hydroxy acrylate compound is added beyond the amount needed to fully convert terminal isocyanate groups to terminal acrylate groups. In different embodiments, supplemental hydroxy acrylate compound is included in the initial reaction mixture (as an amount above the theoretical amount expected from the molar amounts of diisocyanate and polyol), added as the reaction progresses, and/or added after reaction of the diisocyanate and polyol compounds has occurred to completion or pre-determined extent.

Amounts of hydroxy acrylate compound above the amount needed to fully convert isocyanate groups are referred to herein as excess amounts of hydroxy acrylate compound. When added, the excess amount of hydroxy acrylate compound is at least 20% of the amount of supplemental hydroxy acrylate compound needed to fully convert terminal isocyanate groups to terminal acrylate groups, or at least 40% of the amount of supplemental hydroxy acrylate compound needed to fully convert terminal isocyanate groups to terminal acrylate groups, or at least 60% of the amount of supplemental hydroxy acrylate compound needed to fully convert terminal isocyanate groups to terminal acrylate groups, or at least 90% of the amount of supplemental hydroxy acrylate compound needed to fully convert terminal isocyanate groups to terminal acrylate groups.

In an embodiment, the amount of supplemental hydroxy acrylate compound may be sufficient to completely or nearly completely quench residual isocyanate groups present in the oligomer formed in the reaction. Quenching of isocyanate groups is desirable because isocyanate groups are relatively unstable and often undergo reaction over time. Such reaction alters the characteristics of the reaction composition or oligomer and may lead to inconsistencies in coatings formed therefrom. Reaction compositions and products formed from the starting diisocyanate and polyol compounds that are free of residual isocyanate groups are expected to have greater stability and predictability of characteristics.

The oligomer of the primary coating composition includes a polyether urethane diacrylate compound and di-adduct compound as described hereinabove. In some aspects, the oligomer includes two or more polyether urethane diacrylate compounds and/or two or more di-adduct compounds. The oligomer content of the primary coating composition includes the combined amounts of the one or more polyether urethane diacrylate compound(s) and one or more di-adduct compound(s) and is greater than 20 wt %, or greater than 30 wt %, or greater than 40 wt %, or in the range from 20 wt %-80 wt %, or in the range from 30 wt %-70 wt %, or in the range from 40 wt %-60 wt %, where the concentration of di-adduct compound within the oligomer content is as described above.

The curable primary coating composition further includes one or more monomers. The one or more monomers is/are selected to be compatible with the oligomer, to control the viscosity of the primary coating composition to facilitate processing, and/or to influence the physical or chemical properties of the coating formed as the cured product of the primary coating composition. The monomers include radiation-curable monomers such as ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—, or —O—CH(CH$_3$)—CH$_2$—), etc. As used herein, the degree of alkoxylation refers to the number of alkoxylene groups in the monomer. In one embodiment, the alkoxylene groups are bonded consecutively in the monomer.

In some aspects, the primary coating composition includes an alkoxylated monomer of the form R$_4$—R$_5$—O—(CH(CH$_3$)CH$_2$—O)$_q$—C(O)CH=CH$_2$, where R$_4$ and R$_5$ are aliphatic, aromatic, or a mixture of both, and q=1 to 10, or R$_4$—O—(CH(CH$_3$)CH$_2$—O)$_q$—C(O)CH=CH$_2$, where C(O) is a carbonyl group, R$_1$ is aliphatic or aromatic, and q=1 to 10.

Representative examples of monomers include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

In some embodiments, the monomer component of the primary coating composition includes a multifunctional (meth)acrylate. Multifunctional ethylenically unsaturated monomers include multifunctional acrylate monomers and multifunctional methacrylate monomers. Multifunctional acrylates are acrylates having two or more polymerizable acrylate moieties per molecule, or three or more polymerizable acrylate moieties per molecule. Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol diacrylate, propoxylated hexanediol diacrylate, tetrapropyleneglycol diacrylate, pentapropyleneglycol diacrylate, methacrylate analogs of the foregoing, and combinations thereof.

In some aspects, the primary coating composition includes an N-vinyl amide monomer such as an N-vinyl lactam, or N-vinyl pyrrolidinone, or N-vinyl caprolactam, where the N-vinyl amide monomer is present in the coating composition at a concentration greater than 1.0 wt %, or greater than 2.0 wt %, or greater than 3.0 wt %, or in the range from 1.0 wt %-15.0 wt %, or in the range from 2.0 wt %-10.0 wt %, or in the range from 3.0 wt %-8.0 wt %.

In an embodiment, the primary coating composition includes one or more monofunctional acrylate or methacrylate monomers in an amount from 15-90 wt %, or from 30-75 wt %, or from 40-65 wt %. In another embodiment, the primary coating composition may include one or more monofunctional aliphatic epoxy acrylate or methacrylate monomers in an amount from 5-40 wt %, or from 10-30 wt %.

In an embodiment, the monomer component of the primary coating composition includes a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono (meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth) acrylate, 3-hydroxypropyl (meth)acrylate, and 4-hydroxybutyl (meth)acrylate (each available from Aldrich).

In an embodiment, the hydroxyfunctional monomer is present in an amount sufficient to improve adhesion of the primary coating to the optical fiber. The hydroxyfunctional monomer is present in the coating composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the coating. Hydroxyfunctional monomers are described in more detail in U.S. Pat. No. 6,563,996, the disclosure of which is hereby incorporated by reference in its entirety.

In different embodiments, the total monomer content of the primary coating composition is between about 15 wt % and about 90 wt %, or between about 30 wt % and about 75 wt %, or between about 40 wt % and about 65 wt %.

In addition to monomer(s), oligomer(s), and photoinitiator(s), the curable primary coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the primary coating composition (e.g., protect against de-polymerization or oxidative degradation).

An adhesion promoter is a compound that facilitates adhesion of the primary coating and/or primary composition to glass (e.g. the cladding portion of a glass fiber). Suitable adhesion promoters include alkoxysilanes, mercapto-functional silanes, organotitanates, and zirconates. Representative adhesion promoters include mercaptoalkyl silanes or mercaptoalkoxy silanes such as 3-mercaptopropyl-trialkoxysilane (e.g., 3-mercaptopropyl-trimethoxysilane, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from United Chemical Technologies (Bristol, Pa.)); see U.S. Pat. No. 6,316,516, the disclosure of which is hereby incorporated by reference in its entirety herein.

The adhesion promoter is present in the primary coating composition in an amount between 0.02 wt % and 10.0 wt %, or between 0.05 wt % and 4.0 wt %, or between 0.1 wt % and 4.0 wt %, or between 0.1 wt % and 3.0 wt %, or between 0.1 wt % and 2.0 wt %, or between 0.1 wt % and 1.0 wt %, or between 0.5 wt % and 4.0 wt %, or between 0.5 wt % and 3.0 wt %, or between 0.5 wt % and 2.0 wt %, or between 0.5 wt % to 1.0 wt %.

A representative antioxidant is thiodiethylene bis[3-(3,5-di-tert-butyl)-4-hydroxy-phenyl) propionate] (e.g., IRGANOX 1035, available from BASF). In some aspects, an antioxidant is present in the coating composition in an amount greater than 0.25 wt %, or greater than 0.50 wt %, or greater than 0.75 wt %, or greater than 1.0 wt %, or an amount in the range from 0.25 wt %-3.0 wt %, or an amount in the range from 0.50 wt %-2.0 wt %, or an amount in the range from 0.75 wt %-1.5 wt %.

Representative optical brighteners include TINOPAL OB (available from BASF); Blankophor KLA (available from Bayer); bisbenzoxazole compounds; phenylcoumarin compounds; and bis(styryl)biphenyl compounds. In an embodiment, the optical brightener is present in the coating composition at a concentration of 0.005 wt %-0.3 wt %.

Representative amine synergists include triethanolamine; 1,4-diazabicyclo[2.2.2]octane (DABCO), triethylamine, and methyldiethanolamine. In an embodiment, an amine synergist is present at a concentration of 0.02 wt %-0.5 wt %.

Secondary Coating.

The secondary coating is a cured product of a radiation-curable secondary coating composition that includes a monomer, an acylgermane photoinitiator, an optional oligomer, and an optional additive. The present disclosure describes optional oligomers for the radiation-curable secondary coating compositions, radiation-curable secondary coating compositions, cured products of the radiation-curable secondary coating compositions, optical fibers coated with a radiation-curable secondary coating composition, and optical fibers coated with the cured product of a radiation-curable secondary coating composition.

The secondary coating is formed as the cured product of a radiation-curable secondary coating composition that includes a monomer component with one or more monomers. The monomers preferably include ethylenically unsaturated compounds. The one or more monomers may be present in an amount of 50 wt % or greater, or in an amount from about 60 wt % to about 99 wt %, or in an amount from about 75 wt % to about 99 wt %, or in an amount from about 80 wt % to about 99 wt % or in an amount from about 85 wt % to about 99 wt %. In one embodiment, the secondary coating is the radiation-cured product of a secondary coating composition that contains urethane acrylate monomers.

In one embodiment, the monomer component of the curable secondary coating composition includes ethylenically unsaturated monomers. The monomers include functional groups that are polymerizable groups and/or groups that facilitate or enable crosslinking. The monomers are monofunctional monomers or polyfunctional monomers. In combinations of two or more monomers, the constituent monomers are monofunctional monomers, polyfunctional monomers, or a combination of monofunctional monomers and polyfunctional monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers for the curable secondary coating composition include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Representative radiation-curable ethylenically unsaturated monomers included alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—CH$_2$—CH$_2$—), n-propoxylene (—O—CH$_2$—CH$_2$—CH$_2$—), iso-propoxylene (—O—CH$_2$—CH(CH$_3$)—), etc. As used herein, the degree of alkoxylation refers to the number of alkoxylene groups in the monomer. In one embodiment, the alkoxylene groups are bonded consecutively in the monomer.

Representative polyfunctional ethylenically unsaturated monomers for the curable secondary coating composition include, without limitation, alkoxylated bisphenol A diacrylates, such as ethoxylated bisphenol A diacrylate, with the degree of alkoxylation being 2 or greater. The monomer component of the secondary coating composition may include ethoxylated bisphenol A diacrylate with a degree of ethoxylation ranging from 2 to about 30 (e.g. SR349 and SR601 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

The optional oligomer present in the radiation-curable secondary coating composition is preferably a compound with urethane linkages. In one aspect, the optional oligomer is a reaction product of a polyol compound, a diisocyanate compound, and a hydroxy-functional acrylate compound. Reaction of the polyol compound with the diisocyanate compound provides a urethane linkage and the hydroxy-functional acrylate compound reacts with isocyanate groups to provide terminal acrylate groups. If present, the total oligomer content in the radiation-curable secondary coating composition is less than 3.0 wt %, or less than 2.0 wt %, or less than 1.0 wt %, or in the range from 0 wt %-3.0 wt %, or in the range from 0.1 wt %-3.0 wt %, or in the range from 0.2 wt %-2.0 wt %, or in the range from 0.3 wt %-1.0 wt %. In one embodiment, the radiation-curable secondary coating composition is devoid of oligomers.

One class of optional oligomers is ethylenically unsaturated oligomers. When included, suitable oligomers may be monofunctional oligomers, polyfunctional oligomers, or a combination of a monofunctional oligomer and a polyfunctional oligomer. If present, the oligomer component may include aliphatic and aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers or combinations thereof. The curable secondary coating composition may be free of urethane groups, urethane acrylate compounds, urethane oligomers, or urethane acrylate oligomers.

The optional oligomeric component of the curable secondary coating composition may include a difunctional oligomer. A difunctional oligomer has a structure according to formula (XIV) below:

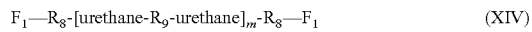

$$F_1—R_8-[\text{urethane-}R_9\text{-urethane}]_m\text{-}R_8—F_1 \quad (XIV)$$

where $F_1$ may independently be a reactive functional group such as acrylate, methacrylate, acrylamide, N-vinyl amide, styrene, vinyl ether, vinyl ester, or other functional group known in the art; $R_8$ may include, independently, —C$_{2-12}$ O—, —(C$_{2-4}$—O)$_n$—, —C$_{2-12}$ O—(C$_{2-4}$—O)$_n$, C$_{2-12}$ O—(CO—C$_{2-5}$ O)$_n$—, or —C$_{2-12}$ O—(CO—C$_{2-5}$ NH)$_n$— where n is a whole number from 1 to 30, including, for example, from 1 to 10; $R_9$ may be a polyether, polyester, polycarbonate, polyamide, polyurethane, polyurea, or combination thereof; and m is a whole number from 1 to 10, including, for example, from 1 to 5. In the structure of formula (I), the urethane moiety may be the residue formed from the reaction of a diisocyanate with $R_9$ and/or $R_8$. The term "independently" is used herein to indicate that each $F_1$ may differ from another $F_1$ and the same is true for each $R_8$.

The optional oligomer component of the curable coating composition may include a polyfunctional oligomer. The polyfunctional oligomer may have a structure according to formula (XV), formula (XVI), or formula (XVII) set forth below:

$$\text{multiurethane-}(F_2—R—F_2)_x \quad (XV)$$

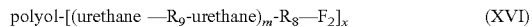

$$\text{polyol-[(urethane —}R_9\text{-urethane})_m\text{-}R_8—F_2]_x \quad (XVI)$$

$$\text{multiurethane-}(R_8—F_2)_x \quad (XVII)$$

where $F_2$ may independently represent from 1 to 3 functional groups such as acrylate, methacrylate, acrylamide, N-vinyl amide, styrene, vinyl ether, vinyl ester, or other functional groups known in the art; $R_8$ can include —C$_{2-12}$ O—, —(C$_{2-4}$—O)$_n$—, —C$_{2-12}$ O—(C$_{2-4}$—O)$_n$, C$_{2-12}$ O—(CO—C$_{2-5}$ O)$_n$—, or —C$_{2-12}$ O—(CO—C$_{2-5}$ NH)$_n$— where n is a whole number from 1 to 10, including, for example, from 1 to 5; $R_9$ may be polyether, polyester, polycarbonate, polyamide, polyurethane, polyurea or combinations thereof; x is a whole number from 1 to 10, including, for example, from 2 to 5; and m is a whole number from 1 to 10, including, for example, from 1 to 5. In the structure of formula (II), the multiurethane group may be the residue formed from reaction of a multiisocyanate with $R_9$. Similarly, the urethane group in the structure of formula (III) may be the reaction product formed following bonding of a diisocyanate to $R_9$ and/or $R_8$.

Urethane oligomers may be prepared by reacting an aliphatic or aromatic diisocyanate with a dihydric polyether or polyester, most typically a polyoxyalkylene glycol such as a polyethylene glycol. Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis.

The radiation-curable secondary coating composition also optionally includes additives such as anti-oxidant(s), optical brightener(s), amine synergist(s), tackifier(s), catalyst(s), a carrier or surfactant, and a stabilizer as described above in connection with the radiation-curable primary coating composition.

Fiber Draw Process.

In a continuous optical fiber manufacturing process, a glass fiber is drawn from a heated preform and sized to a target diameter (typically 125 μm). The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

In some processes, the coating system further applies a tertiary coating composition to the secondary coating and cures the tertiary coating composition to form a solidified tertiary coating. Typically, the tertiary coating is an ink layer used to mark the fiber for identification purposes and has a composition that includes a pigment and is otherwise similar to the secondary coating. The tertiary coating is applied to the secondary coating and cured. The secondary coating has typically been cured at the time of application of the tertiary coating. The primary, secondary, and tertiary coating compositions can be applied and cured in a common continuous manufacturing process. Alternatively, the primary and secondary coating compositions are applied and cured in a common continuous manufacturing process, the coated fiber is collected, and the tertiary coating composition is applied and cured in a separate offline process to form the tertiary coating.

Each of the primary, secondary, and tertiary compositions are curable with any of the wavelengths and any of the light sources referred to above. The same wavelength or source can be used to cure each of the primary, secondary, and tertiary compositions, or different wavelengths and/or different sources can be used to cure the primary, secondary, and tertiary compositions. Curing of the primary, secondary, and tertiary compositions can be accomplished with a single wavelength or a combination of two or more wavelengths.

To improve process efficiency, it is desirable to increase the draw speed of the fiber along the process pathway extending from the preform to the collection point. As the draw speed increases, however, the cure speed of coating compositions must increase. The coating compositions disclosed herein are compatible with fiber draw processes that operate at a draw speed greater than 35 m/s, or greater than 40 m/s, or greater than 45 m/s, or greater than 50 m/s, or greater than 55 m/s, or greater than 60 m/s, or greater than 65 m/s, or greater than 70 m/s.

The present disclosure extends to optical fibers coated with the cured product of the coating compositions. The optical fiber includes a glass waveguide with a higher index glass core region surrounded by a lower index glass cladding region. A coating formed as a cured product of the present coating compositions surrounds and is in direct contact with the glass cladding. The cured product of the present coating compositions functions as a primary coating, secondary coating, or tertiary coating of the fiber.

EXAMPLES

Illustrative primary and secondary coatings were prepared with an acylgermane photoinitiator and tested. The tests included measurements of tensile properties (Young's modulus, % elongation, and tear strength) and cure speed. The description of the components of the coating compositions, processing conditions, test methodologies, and test results are described hereinbelow.

Primary Coating Composition.

The components of a representative curable primary coating composition A and a comparative curable primary composition B are summarized in Table 1. Except for the photoinitiator, the curable primary coating compositions A and B were identical. Curable primary coating composition A included an acylgermane photoinitiator (BMBDEG), while curable primary coating composition B included a phosphine oxide photoinitiator (MAPO). The molecular structures of BMBDEG and MAPO are shown below:

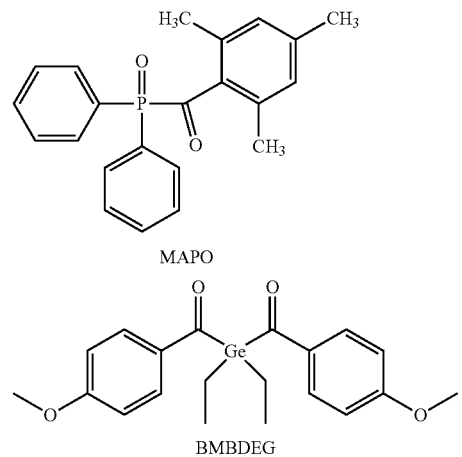

TABLE 1

Primary Coating Formulations

| Component | Composition A | Composition B |
|---|---|---|
| Oligomer (wt %) | 49.10 | 49.10 |
| SR504 (wt %) | 45.66 | 45.66 |
| NVC (wt %) | 1.96 | 1.96 |
| BMBDEG (wt %) | 1.47 | |
| MAPO (wt %) | | 1.47 |
| Irganox 1035 (wt %) | 0.98 | 0.98 |
| 3-mercaptopropyltrimethoxysilane (wt %) | 0.79 | 0.79 |
| Tetrathiol (wt %) | 0.03 | 0.03 |

The oligomer was a product of a reaction of H12MDI (4,4'-methylene bis(cyclohexyl isocyanate), PPG4000 (polypropylene glycol with $M_n$~4000 g/mol) and HEA (2-hydroxyethyl acrylate). The reaction conditions are described below. SR504 is ethoxylated(4)nonylphenol acrylate (available from Sartomer). NVC is N-vinylcaprolactam (available from ISP Technologies). Irganox 1035 is thiodiethylene bis[3-(3,5-di-tert-butyl)-4-hydroxy-phenyl) propionate] (available from BASF under the trade name Irganox 1035) and functions as an antioxidant. 3-mercaptopropyl trimethoxysilane (available from Aldrich) is an adhesion promoter. Tetrathiol is pentaerythritoltetrakis(3-mercaptopropionate) (available from Aldrich) and functions as a quencher of residual dibutyltin dilaurate catalyst that may be present in the oligomer.

Oligomer Synthesis.

The oligomer was prepared from a reaction of H12MDI (4,4'-methylene bis(cyclohexyl isocyanate), PPG4000 (polypropylene glycol with $M_n$~4000 g/mol) and HEA (2-hydroxyethyl acrylate) in accordance with the reaction scheme disclosed hereinabove. All reagents were used as supplied by the manufacturer and were not subjected to further purification. H12MDI was obtained from ALDRICH. PPG4000 was obtained from COVESTRO and was certified to have an unsaturation of 0.004 meq/g as determined by the method described in the standard ASTM D4671-16. HEA was obtained from KOWA.

The oligomer was prepared with the amounts and molar ratio of reactants (H12MDI:HEA:PPG4000=n:m:p) shown in Tables 2 and 3. The mole number ratio n:m:p was normalized to set the mole number p of PPG4000 to 2.0. Dibutyltin dilaurate was used as a catalyst (at a level of 160 ppm based on the mass of the initial reaction mixture) and 2,6-di-tert-butyl-4-methylphenol (BHT) was used as an inhibitor (at a level of 400 ppm based on the mass of the initial reaction mixture).

TABLE 2

Reactants and Amounts for the Oligomer

| H12MDI (g) | HEA (g) | PPG4000 (g) |
|---|---|---|
| 28.24 | 13.44 | 208.32 |

TABLE 3

Mole Numbers and Di-adduct Content for the Oligomer

| H12MDI Mole Number (n) | HEA Mole Number (m) | PPG4000 Mole Number (p) | Di-adduct (wt %) |
|---|---|---|---|
| 4.0 | 4.3 | 2.0 | 5.3 |

The oligomer 2 was prepared by mixing H12MDI (4,4'-methylene bis(cyclohexyl isocyanate)), dibutyltin dilaurate and 2,6-di-tert-butyl-4 methylphenol at room temperature in a 500 mL flask. The 500 mL flask was equipped with a thermometer, a $CaCl_2$ drying tube, and a stirrer. While continuously stirring the contents of the flask, PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic nature of the reaction). After the PPG4000 was added, the reaction mixture was heated in an oil bath at about 70° C.-75° C. for about 1-1½ hours. At various intervals, samples of the reaction mixture were retrieved for analysis by infrared spectroscopy (FTIR) to monitor the progress of the reaction by determining the concentration of unreacted isocyanate groups. The concentration of unreacted isocyanate groups was assessed based on the intensity of a characteristic isocyanate stretching mode near 2265 $cm^1$. The flask was removed from the oil bath and its contents were allowed to cool to below 65° C. Addition of HEA was conducted to insure complete quenching of isocyanate groups. The HEA was added dropwise over 2-5 minutes using an addition funnel. After addition of the HEA, the flask was returned to the oil bath and its contents were again heated to about 70° C.-75° C. for about 1-1½ hours. FTIR analysis was conducted on the reaction mixture to assess the presence of isocyanate groups and the process was repeated until enough HEA was added to fully react any unreacted isocyanate groups. The reaction was deemed complete when no appreciable isocyanate stretching intensity was detected in the FTIR measurement. The HEA amounts listed in Table 1 include the total amount of HEA added to the composition.

The concentration (wt %) of di-adduct compound was determined by gel permeation chromatography (GPC). A Waters Alliance 2690 GPC instrument was used to determine the di-adduct concentration. The mobile phase was THF. The instrument included a series of three Polymer Labs columns. Each column had a length of 300 mm and an inside diameter of 7.5 mm. Two of the columns (columns 1 and 2) were sold under Part No. PL1110-6504 by Agilent Technologies and were packed with PLgel Mixed D stationary phase (polystyrene divinyl benzene copolymer, average particle size=5 m, specified molecular weight range=200-400,000 g/mol). The third column (column 3) was sold under Part No. PL1110-6520 by Agilent Technologies and was packed with PLgel 100A stationary phase (polystyrene divinyl benzene copolymer, average particle size=5 m, specified molecular weight range=up to 4,000 g/mol). The columns were calibrated with polystyrene standards ranging from 162-6,980,000 g/mol using EasiCal PS-1 & 2 polymer calibrant kits (Agilent Technologies Part Nos. PL2010-505 and PL2010-0601). The GPC instrument was operated under the following conditions: flow rate=1.0 mL/min, column temperature=40° C., injection volume=100 μL, and run time=35 min (isocratic conditions). The detector was a Waters Alliance 2410 differential refractometer operated at 40° C. and sensitivity level 4. The sample was injected twice along with a THF+0.05% toluene blank.

The amount (wt %) of di-adduct in the oligomer was quantified using the preceding GPC system and technique. A calibration curve was obtained using standard solutions containing known amounts of the di-adduct compound (HEA~H12MDI~HEA) in THF. Standard solutions with di-adduct concentrations of 115.2 μg/g, 462.6 μg/g, 825.1 μg/g, and 4180 μg/g were prepared. (As used herein, the dimension "μg/g" refers to μg of di-adduct per gram of total solution (di-adduct+THF)). Two 100 μL aliquots of each di-adduct standard solution were injected into the column to obtain the calibration curve. The retention time of the di-adduct was approximately 23 min and the area of the GPC peak of the di-adduct was measured and correlated with di-adduct concentration. A linear correlation of peak area as a function of di-adduct concentration was obtained (correlation coefficient ($R^2$)=0.999564).

The di-adduct concentration in the oligomer was determined using the calibration. Samples were prepared by diluting ~0.10 g of each oligomer in THF to obtain a ~1.5 g test solution. The test solution was run through the GPC instrument and the area of the peak associated with the di-adduct compound was determined. The di-adduct concentration in units of μg/g was obtained from the peak area and the calibration curve, and was converted to wt % by multiplying by the weight (g) of the test solution and dividing by the weight of the sample of oligomer before dilution with THF. The wt % of di-adduct compound present in the oligomer is reported in Table 3. The entry in Table 1 for the oligomer include the combined amount of polyether urethane acrylate compound and di-adduct compound. The polyether urethane compound was of the type shown in molecular formula (XV) hereinabove and the di-adduct compound was of the type shown in molecular formula (XVI) hereinabove.

Preparation of Coating Compositions.

The coating compositions of Table 1 were each formulated using a high-speed mixer in an appropriate container heated to 60° C., with a heating band or heating mantle. In each case, the components were weighed into the container using a balance and allowed to mix until the solid components were thoroughly dissolved and the mixture appeared homogeneous. The oligomer and monomers (SR504, NVC) of each composition were blended together for at least 10 minutes at 55° C.-60° C. The photoinitiator, antioxidant, and catalyst quencher were then added, and blending was continued for one hour while maintaining a temperature of 55° C.-60° C. Finally, the adhesion promoter was added, and blending was continued for 30 minutes at 55° C.-60° C. to form the coating compositions A and B.

Various properties of cured products formed by curing the coating compositions A and B were measured. A discussion of curing conditions, sample configuration and properties follows.

Tensile Properties.

Young's modulus (E) was measured on films formed by curing coating compositions A and B. Separate films were formed from each coating composition. Wet films of the coating composition were cast on silicone release paper with the aid of a draw-down box having a gap thickness of about 0.005". The wet films were cured with a UV dose of 1.2 J/cm$^2$ (measured over a wavelength range of 225-424 nm by a Light Bug model IL490 from International Light) by a Fusion Systems UV curing apparatus with a 600 W/in D-bulb (50% Power and approximately 12 ft/min belt speed) to yield cured coatings in film form. Cured film thickness was between about 0.0030" and 0.0035".

The films were aged (23° C., 50% relative humidity) for at least 16 hours prior to testing. Film samples were cut to dimensions of 12.5 cm×13 mm using a cutting template and a scalpel. Young's modulus, tensile strength at break, and % elongation (% strain at break) were measured at room temperature (approximately 20° C.) on the film samples using a MTS Sintech tensile test instrument following procedures set forth in ASTM Standard D882-97. Young's modulus is defined as the steepest slope of the beginning of the stress-strain curve. Films were tested at an elongation rate of 2.5 cm/min with the initial gauge length of 5.1 cm. The results are shown in Table 4.

TABLE 4

Tensile Properties of Cured Coating Compositions

| Composition | Young's Modulus (E) | % Elongation | Tensile Strength |
|---|---|---|---|
| A | 0.70 ± 0.02 MPa | 149 ± 25.8 | 0.52 ± 0.09 MPa |
| B | 0.70 ± 0.02 MPa | 138 ± 15.0 | 0.48 ± 0.04 MPa |

Through variations in the mole numbers n, m, and p, primary coatings having a Young's modulus (E) over a wide range are achievable. The Young's modulus (E) of primary coatings made with an acylgermane photoinitiator have a Young's modulus (E) of less than 1.0 MPa, or less than 0.8 MPa, or less than 0.7 MPa, or less than 0.6 MPa, or less than 0.5 MPa, or in the range from 0.1 MPa-1.0 MPa, or in the range from 0.3 MPa-1.0 MPa, or in the range from 0.45 MPa-1.0 MPa, or in the range from 0.2 MPa-0.9 MPa, or in the range from 0.3 MPa-0.8 MPa, where Young's modulus (E) is determined according to the procedure described herein.

Cure Speed.

Cure speeds of coating compositions A and B were measured by using FTIR spectroscopy to monitor the conversion of acrylate double bonds to single bonds as a function of time. The area of the —C═C— band extending from 1396 cm$^{-1}$-1419 cm$^{-1}$ was monitored. The band had peak intensity at about 1410 cm$^{-1}$. Cure speed measurements analyze the rate of cure of a material during exposure to curing radiation. Cure speed measurements are related to degree of cure measurements in that the disappearance of the acrylate species is measured. However, the degree of cure is a static measurement, which is performed on a finished cured product. Cure speed is a dynamic measurement that monitors the curing reaction during the curing process as the coating composition evolves to form a coating (or cured product). From one perspective, the cure speed can be regarded as a series of degree of cure measurements taken over a period of time during exposure to curing radiation. The end result of the cure speed measurement is a plot of degree of cure (DOC) vs. time. For purposes of the present description, the degree of cure is expressed as % cure, a quantity described below.

All cure speed data disclosed herein were acquired using a Bruker Vertex 80 FTIR spectrometer operating in Rapid Scan mode. Thin films (1 mil wet thickness) of the coating composition in an uncured state were drawn on a Bruker Platinum ATR unit A225/Q-DLST equipped with a diamond ATR crystal and a built in temperature controller. The sample chamber was purged for ~30 s with house nitrogen. The sample was irradiated for 1 s using a Lesco Cool Cure LED system (395 nm LED curing source). The temperature of the thin film sample of uncured coating composition was 55° C. when curing was initiated and the curing intensity was 4.0 mW/cm$^2$. Exposure time was controlled using a UniBlitz® VS25 with model T132 driver. Spectra were obtained before, during, and after the 1 second exposure at a rate of 1 scan every 35 ms. The sample was then irradiated with a 10 s exposure to complete the cure and monitored for several scans.

Percent cure (% cure) values were calculated from the peak area (PA) of the acrylate band extending from 1396 cm$^{-1}$-1419 cm$^{-1}$ using the following formula:

$$\% \text{ cure} = \frac{PA_{uncured} - PA_{sample}}{PA_{uncured} - PA_{fully\ cured}} \times 100$$

PA$_{uncured}$ corresponds to the uncured peak area before exposure to curing radiation, PA$_{fully}$ cured corresponds to the peak area of the fully cured state, and PA$_{sample}$ corresponds to the peak area at intermediate times between the uncured and fully cured states. The % cure represents the time-dependent conversion of acrylate double bonds. The % cure was calculated for each spectrum acquired during the time period monitored and % cure vs. time plots were constructed.

Figure 4:
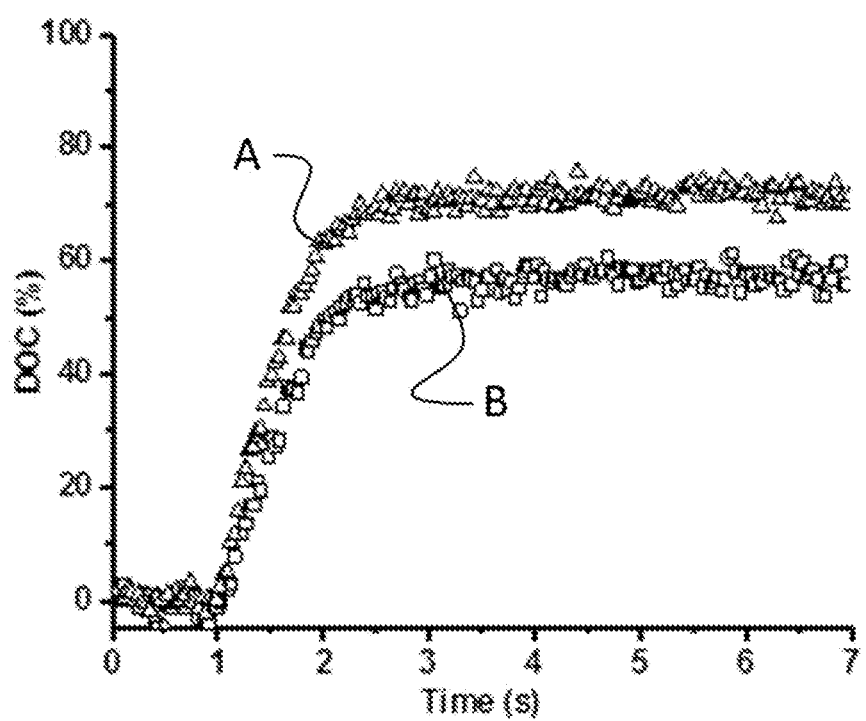
FIG. 4 shows degree of cure (DOC) as a function of time for a curable coating composition with a phosphine oxide photoinitiator and a curable coating composition with an acylgermane photoinitiator.

FIG. 4 shows a plot of the degree of cure (DOC, expressed as % and corresponding to % cure as defined in the equation above) as a function of time for curable compositions A and B. In the time period between 0 sec and 1 sec, spectra of the uncured compositions were acquired and the % cure was zero. At a time of 1 sec, the curing reaction was initiated by exposing the thin film samples of curable coating compositions A and B to the curing radiation (395 nm LED). Curing was allowed to continue for 1 sec. At a time of 2 sec, the curing radiation was turned off. A rapid increase in % cure occurs upon exposure of the coating composition to the curing radiation between times of 1 sec and 2 sec. The curing process was also monitored with the curing source turned off between 2 sec and 7 sec.

Cure speed is a measure of the rate of the curing reaction and can be obtained from the slope of a % cure plot of the type shown in FIG. 4. As is evident from FIG. 4, the slope changes as the curing reaction proceeds. The evolution of the physical state of the system during the curing reaction influences the cure speed. In the early stages of curing, the coating composition is more fluid (less viscous). As curing proceeds and conversion increases, the coating composition becomes more viscous and ultimately becomes rigid as a solid coating is formed. When the coating composition becomes sufficiently viscous, the curing reaction becomes diffusion limited and cure speed is influenced by both the kinetics of the curing reaction and diffusivity of the compounds in the coating composition.

To avoid the effect of diffusion on cure speed, cure speed is defined on the basis of conversion before the curing reaction becomes diffusion limited. More specifically, cure speed is defined as the slope of the conversion plot between 10% and 40% conversion. The slope of the conversion plot between 10% and 40% conversion was observed to be nearly constant in the measurements performed in the examples described herein. The nearly constant slope indicates that the curing reaction is dominated by the kinetics of the curing reaction for conversions below 40% and that the reaction becomes diffusion limited at some conversion above 40%. Cure speeds reported herein were determined according to this procedure and have units of %/sec, where % refers to % cure. From the data shown in FIG. 4, the cure speed of curable coating composition A was determined to be 76%/s and the cure speed of curable coating composition B was determined to be 50%/s.

The cure results show that faster cure speeds and higher degrees of cure are obtained when using an acylgermane photoinitiator relative to a common phosphine oxide photoinitiator.

Secondary Coating Composition.

A representative secondary coating composition that includes an acylgermane photoinitiator is listed in Table 5.

TABLE 5

| Secondary Coating Composition | |
|---|---|
| Component | Composition C |
| SR601 (wt %) | 72.0 |
| CD9038 (wt %) | 10.0 |
| Photomer 3016 (wt %) | 15.0 |
| BMBDEG (wt %) | 1.5 |
| Irgacure 184 (wt %) | 1.5 |
| Irganox 1035 (pph) | 0.5 |
| DC-190 (pph) | 1.0 |

SR601 is ethoxylated (4) bisphenol A diacrylate (a monomer). CD9038 is ethoxylated (30)bisphenol A diacrylate (a monomer). Photomer 3016 is bisphenol A epoxy diacrylate (a monomer). BMBDEG is an acylgermane photoinitiator (see above). Irgacure 184 is 1-hydroxycyclohexylphenyl ketone (a photoinitiator). Irganox 1035 is thiodiethylene bis(3,5-di-tert-butyl)-4-hydroxyhydrocinnamate (an antioxidant). DC190 is silicone-ethylene oxide/propylene oxide copolymer (a slip agent). The concentration unit "pph" refers to an amount relative to a base composition that includes SR601, CD9038, Photomer 3016, BMBDEG, and Irgacure 184. A concentration of 1.0 pph corresponds to 1 g per 100 g combined of SR601, CD9038, Photomer 3016, BMBDEG, and Irgacure 184.

Aspect 1 of the description is:
A coating composition comprising:
a radiation-curable monomer;
an adhesion promoter, the adhesion promoter comprising an alkoxysilane compound or a mercapto-functional silane compound; and
a photoinitiator, the photoinitiator comprising an acylgermane compound having the formula

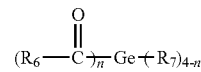

wherein $R_6$ and $R_7$ are independently H, an alkyl group, an aryl group, an amine group, or a halogen group; and n=1-4.

Aspect 2 of the description is:
The coating composition of Aspect 1, wherein the radiation-curable monomer comprises an acrylate group or a methacrylate group.

Aspect 3 of the description is:
The coating composition of Aspect 1 or 2, wherein the adhesion promoter comprises a mercapto-functional silane compound.

Aspect 4 of the description is:
The coating composition of Aspect 3, wherein the mercapto-functional silane compound comprises an alkoxy group.

Aspect 5 of the description is:
The coating composition of any of Aspects 1-4, wherein n is 1 or 2.

Aspect 6 of the description is:
The coating composition of any of Aspects 1-5, wherein $R_6$ is an aryl group and $R_7$ is an alkyl group.

Aspect 7 of the description is:

The coating composition of any of Aspects 1-4 and 6, wherein the acylgermane compound is selected from the group consisting of:

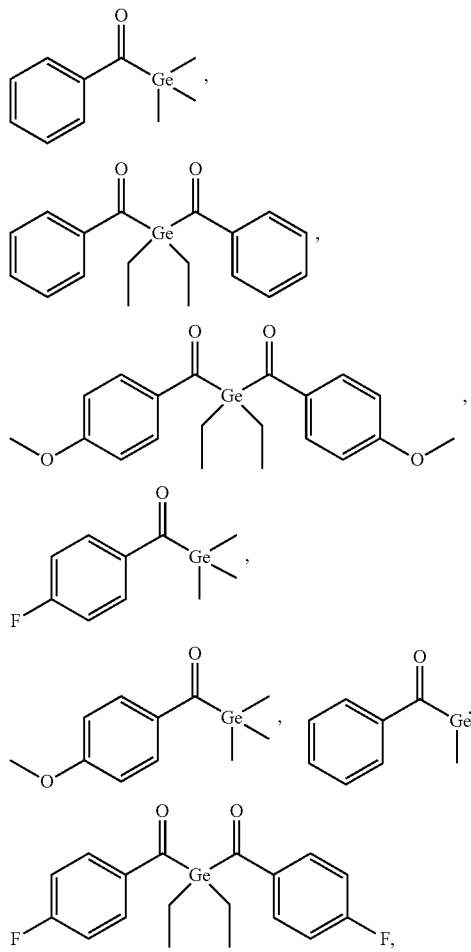

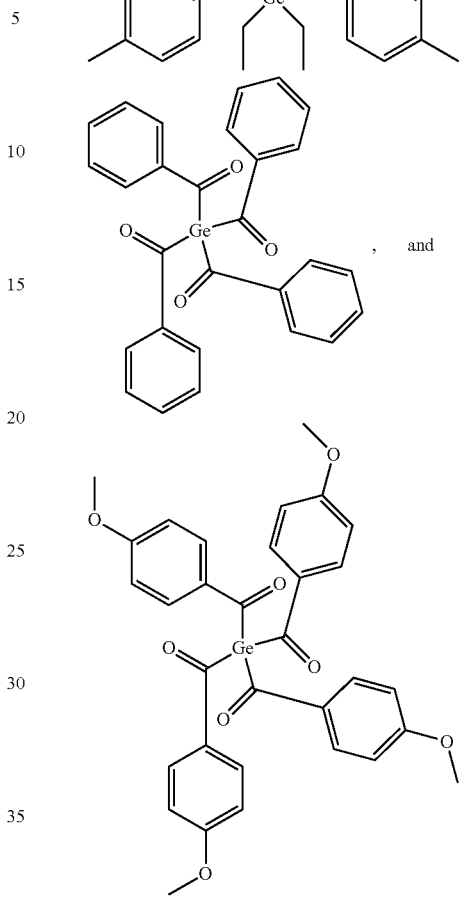

, and

Aspect 8 of the description is:
The coating composition of any of Aspects 1-7, further comprising an oligomer, the oligomer comprising:
a polyether urethane acrylate compound having the molecular formula:

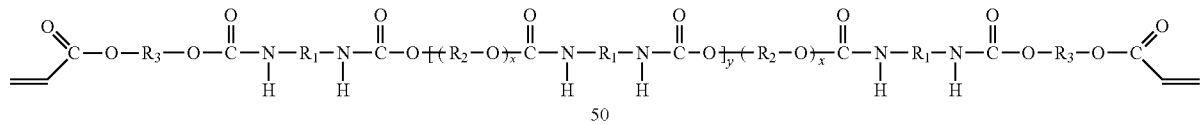

wherein
$R_1$, $R_2$ and $R_3$ are independently selected from linear alkylene groups, branched alkylene groups, or cyclic alkylene groups;
y is 1, 2, 3, or 4; and
x is between 40 and 100.

Aspect 9 of the description is:
The coating composition of Aspect 8, wherein the oligomer further comprises:
a di-adduct compound having the molecular formula:

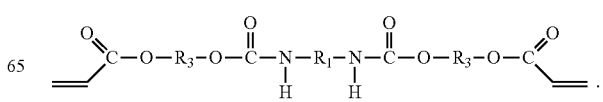

Aspect 10 of the description is:
The coating composition of Aspect 9, wherein the di-adduct compound is present in an amount of at least 1.0 wt % in the oligomer.

Aspect 11 of the description is:
The coating composition of any of Aspects 8-10, wherein the oligomer is the cured product of a reaction between:
a diisocyanate compound;
a hydroxy (meth)acrylate compound; and
a polyol compound, said polyol compound having unsaturation less than 0.1 meq/g;
wherein said diisocyanate compound, said hydroxy (meth)acrylate compound and said polyol compound are reacted in molar ratios n:m:p, respectively, wherein n is in the range from 3.0-5.0, m is in the range from 1.5-4.0, and p is 2.

Aspect 12 of the description is:
The coating composition of any of Aspects 8-11, wherein the coating composition comprises 30 wt %-70 wt % of the oligomer.

Aspect 13 of the description is:
The cured product of the coating composition of any of Aspects 1-12.

Aspect 14 of the description is:
An optical fiber comprising:
a glass core;
a glass cladding surrounding and in direct contact with the glass core; and
a cured product of the coating composition of any of Aspects 1-13, the cured product surrounding and in direct contact with the glass cladding.

Aspect 15 of the description is:
A method of forming a cured product comprising:
curing a coating composition, the coating composition comprising:
a radiation-curable monomer;
an adhesion promoter, the adhesion promoter comprising an alkoxysilane compound or a mercapto-functional silane compound; and
a photoinitiator, the photoinitiator comprising an acylgermane compound having the formula

wherein $R_6$ and $R_7$ are independently H, an alkyl group, an aryl group, an amine group, or a halogen group; and n=1-4.

Aspect 16 of the description is:
The method of Aspect 15, wherein the curing is accomplished with an LED source.

Aspect 17 of the description is:
The method of Aspect 16, wherein the LED source has a wavelength in the range from 345 nm-410 nm.

Aspect 18 of the description is:
A method of forming an optical fiber comprising:
drawing an optical fiber from a preform at a draw speed greater than 35 m/s; and
while the optical fiber is moving at the draw speed, applying a coating composition to the optical fiber, the coating composition comprising: an acylgermane photoinitiator, the acylgermane photoinitiator having the formula

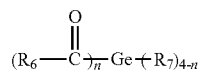

wherein $R_6$ and $R_7$ are independently H, an alkyl group, an aryl group, an amine group, or a halogen group; and n=1-4; and
curing the coating composition.

Aspect 19 of the description is:
The method of Aspect 18, wherein the draw speed is greater than 55 m/s.

Aspect 20 of the description is:
A coating composition comprising:
a first monomer with a radiation-curable group;
a phosphine oxide photoinitiator; and
an acylgermane photoinitiator, the acylgermane photoinitiator having the formula

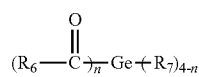

wherein $R_6$ and $R_7$ are independently H, an alkyl group, an aryl group, an amine group, or a halogen group; and n=1-4.

Aspect 21 of the description is:
The coating composition of Aspect 20, wherein the first monomer comprises a first bisphenol A diacrylate compound.

Aspect 22 of the description is:
The coating composition of Aspect 21, further comprising a second bisphenol A diacrylate compound.

Aspect 23 of the description is:
The coating composition of Aspect 22, wherein the first bisphenol A diacrylate compound is an alkoxylated bisphenol A diacrylate compound and the second bisphenol A diacrylate compound is a bisphenol A epoxy diacrylate compound.

Aspect 24 of the description is:
The coating composition of any of Aspects 20-23, wherein the phosphine oxide photoinitiator comprises:

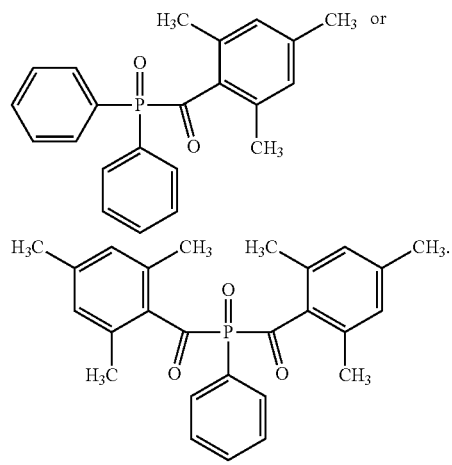

Aspect 25 of the description is:

The coating composition of any of Aspects 20-24, wherein the acylgermane photoinitiator is selected from the group consisting of:

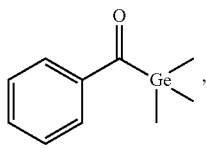

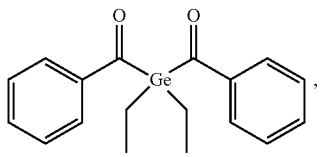

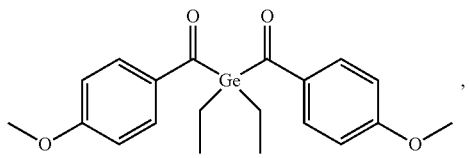

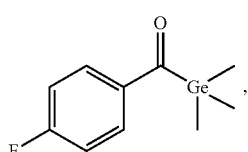

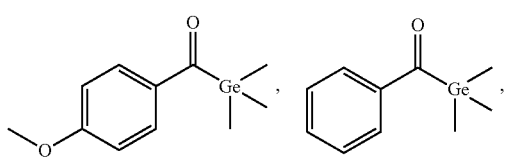

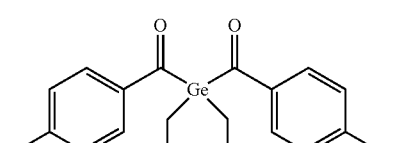

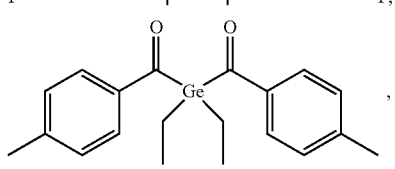

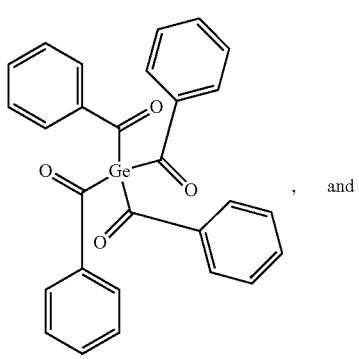, and

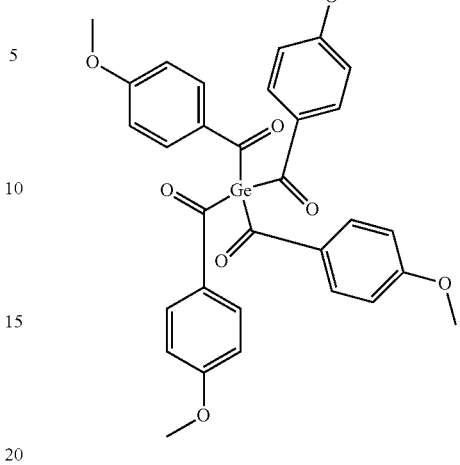

Aspect 26 of the description is:
The cured product of the coating composition of any of Aspects 20-25.

Aspect 27 of the description is:
An optical fiber comprising:
a glass core;
a glass cladding surrounding and in direct contact with the glass core; and
a cured product of the coating composition of any of Aspects 20-26, the cured product surrounding the glass cladding.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:
1. A coating composition comprising:
an alkoxylated bisphenol A diacrylate compound;
a bisphenol A epoxy diacrylate compound;
a phosphine oxide photoinitiator; and
an acylgermane photoinitiator, the acylgermane photoinitiator having the formula

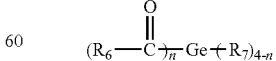

wherein $R_6$ and $R_7$ are independently H, an alkyl group, an aryl group, an amine group, or a halogen group; and
n=1-4.

2. The coating composition of claim 1, wherein the phosphine oxide photoinitiator comprises:

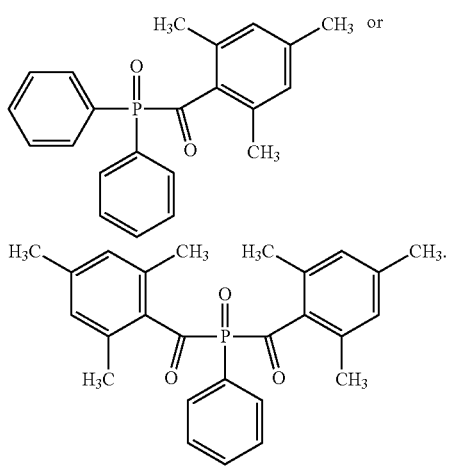
3. The coating composition of claim 1, wherein the acylgermane photoinitiator is selected from the group consisting of:
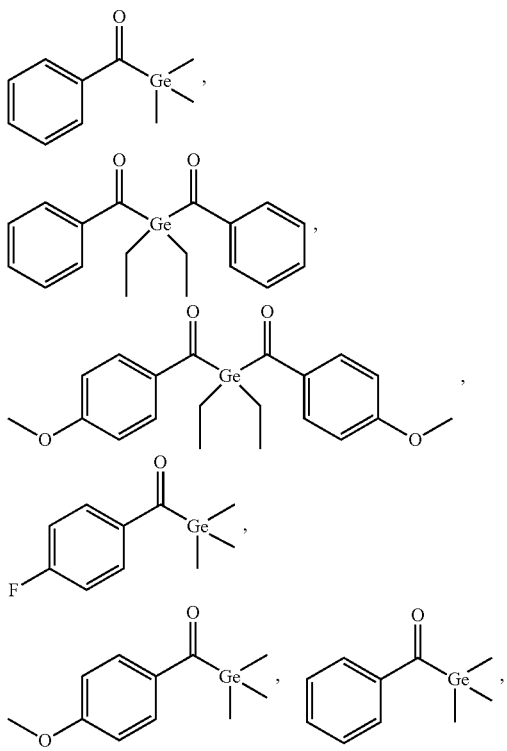
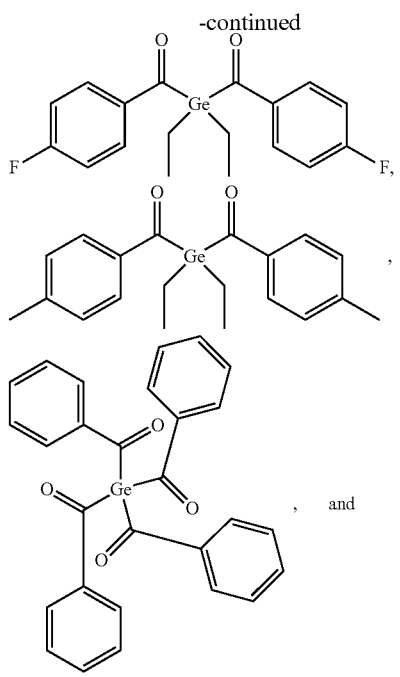
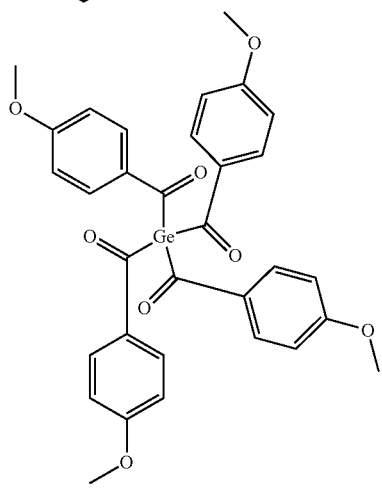
4. An optical fiber comprising:
a glass core;
a glass cladding surrounding and in direct contact with the glass core; and
a cured product of the coating composition of claim 1, the cured product surrounding the glass cladding.
* * * * *

UNITED STATES PATENT AND TRADEMARK OFFICE
CERTIFICATE OF CORRECTION

PATENT NO. : 11,319,456 B2
APPLICATION NO. : 16/681297
DATED : May 3, 2022
INVENTOR(S) : Bin Yang It is certified that error appears in the above-identified patent and that said Letters Patent is hereby corrected as shown below:

On the Title Page

Page 2, item [56], Column 2, Lines 2-3, delete "d e n t a l m a t e r i a l s 3 2 (2 0 1 6 )" and insert -- dental materials 32 (2016) --.

Page 2, item [56], Column 2, Line 5, delete "(2018." and insert -- (2018). --.

Page 2, item [56], Column 2, Line 9, delete "(2017." and insert -- (2017). --.

Signed and Sealed this
Second Day of August, 2022

Katherine Kelly Vidal
*Director of the United States Patent and Trademark Office*